(12) United States Patent
Yoshida et al.

(10) Patent No.: US 9,311,684 B2
(45) Date of Patent: Apr. 12, 2016

(54) LENS TREATMENT MANAGEMENT SYSTEM

(75) Inventors: Yoshinori Yoshida, Tokyo (JP); Yukio Honma, Tokyo (JP)

(73) Assignee: NIKON-ESSILOR CO., LTD., Tokyo (JP)

( * ) Notice: Subject to any disclaimer, the term of this patent is extended or adjusted under 35 U.S.C. 154(b) by 1315 days.

(21) Appl. No.: 13/061,516

(22) PCT Filed: Aug. 28, 2009

(86) PCT No.: PCT/JP2009/004213
§ 371 (c)(1),
(2), (4) Date: Oct. 12, 2011

(87) PCT Pub. No.: WO2010/023941
PCT Pub. Date: Mar. 4, 2010

(65) Prior Publication Data
US 2012/0022985 A1    Jan. 26, 2012

(30) Foreign Application Priority Data

Aug. 29, 2008  (JP) .................................. 2008-221906
Aug. 29, 2008  (JP) .................................. 2008-221907

(51) Int. Cl.
*G06F 19/00*   (2011.01)
*G06Q 50/04*   (2012.01)
*B24B 9/14*    (2006.01)
*B24D 99/00*   (2010.01)
*G06Q 30/04*   (2012.01)

(52) U.S. Cl.
CPC ................ *G06Q 50/04* (2013.01); *B24B 9/148* (2013.01); *B24D 99/005* (2013.01); *G06Q 30/04* (2013.01)

(58) Field of Classification Search
CPC ..... G06Q 30/04; G06Q 50/04; B24D 99/005; B24B 9/148
USPC ........... 700/95, 97, 98, 117, 118, 182; 705/34
See application file for complete search history.

(56) References Cited

U.S. PATENT DOCUMENTS

| 6,199,983 | B1 | 3/2001 | Kato et al. |
| 6,592,431 | B2 * | 7/2003 | Mizuno et al. ..................... 451/9 |
| 6,719,609 | B2 * | 4/2004 | Mizuno et al. .................. 451/10 |
| 6,746,120 | B2 * | 6/2004 | Broderick et al. ........ 351/159.69 |
| 6,751,598 | B1 | 6/2004 | Yagawa et al. |

(Continued)

FOREIGN PATENT DOCUMENTS

| EP | 0 880 046 | 11/1998 |
| EP | 1 515 179 | 3/2005 |

(Continued)

OTHER PUBLICATIONS

English Translation of an Office Action dated Nov. 5, 2013 issued in the corresponding Japanese Patent Application No. 2010-526566.

(Continued)

*Primary Examiner* — Charles Kasenge
(74) *Attorney, Agent, or Firm* — Cozen O'Connor

(57) ABSTRACT

A lens processing management system (1) includes: a processing device (20) which processes lenses; a data supply device (10) which can supply design data to the processing device; and a control means (24) which limits the processing of lenses using the design data in the processing device.

32 Claims, 22 Drawing Sheets

(56) References Cited

U.S. PATENT DOCUMENTS

| | | | |
|---|---|---|---|
| 6,792,401 B1 * | 9/2004 | Nigro et al. | 703/6 |
| 6,890,241 B2 * | 5/2005 | Kozakai et al. | 451/5 |
| 7,083,278 B2 * | 8/2006 | Broderick et al. | 351/159.24 |
| 7,159,982 B2 * | 1/2007 | Shinohara et al. | 351/159.74 |
| 7,364,293 B2 * | 4/2008 | Broderick et al. | 351/159.74 |
| 7,603,191 B2 * | 10/2009 | Gross | 700/97 |
| 8,172,640 B2 * | 5/2012 | Tanaka et al. | 451/5 |
| 2002/0022436 A1 * | 2/2002 | Mizuno et al. | 451/10 |
| 2002/0115381 A1 * | 8/2002 | Mizuno et al. | 451/9 |
| 2003/0055788 A1 | 3/2003 | Sakuma et al. | |
| 2005/0073650 A1 | 4/2005 | Ito | |
| 2005/0157254 A1 * | 7/2005 | Shinohara et al. | 351/158 |
| 2009/0036025 A1 * | 2/2009 | Tanaka et al. | 451/5 |
| 2009/0036040 A1 * | 2/2009 | Tanaka | 451/255 |

FOREIGN PATENT DOCUMENTS

| | | |
|---|---|---|
| EP | 1 555 588 | 7/2005 |
| JP | 10-021144 | 1/1998 |
| JP | 10-21144 | 1/1998 |
| JP | 10-161864 | 6/1998 |
| JP | 2002-32668 | 1/2002 |
| JP | 2002-55726 | 2/2002 |
| JP | 2002-174800 | 6/2002 |
| JP | 2003-099143 | 4/2003 |
| JP | 2003-228657 | 8/2003 |
| JP | 2005-91425 | 4/2005 |
| JP | 2005-100364 | 4/2005 |
| JP | 2005-202291 | 7/2005 |
| JP | 2006-126877 | 5/2006 |
| WO | WO 2009/034772 | 3/2009 |

OTHER PUBLICATIONS

International Search Report dated Oct. 27, 2009 issued in the corresponding International Patent Application No. PCT/JP2009/004213.
Written Opinion dated Oct. 27, 2009 issued in the corresponding International Patent Application No. PCT/JP2009/004213.
Office Action dated Aug. 5, 2015 which issued in the corresponding Chinese Patent Application No. 201310306354.4.
Office Action dated Feb. 9, 2016 which issued in the corresponding Japanese Patent Application No. 2015-038195.
Office Action dated Jan. 14, 2016 which issued in Canadian Patent Application No. 2,735,704.

* cited by examiner

FIG. 3

```
<Lens data ID>  aaa1
<Availability time limit>  20100810
<Available usage number>  5
<Plane shape data>
x1  y1  z1
x2  y2  z2
x3  y3  z3
x4  y4  z4
x5  y5  z5
   .
   .
   .
```

FIG. 4

| Lens data ID | Usage number |
|---|---|
| aaa1 | 10 |
| bbb2 | 5 |
| ccc3 | 4 |
| ⋮ | ⋮ |

FIG. 9

```
<Lens data ID>  aaa1
<Plane shape data>
x1 y1 z1
x2 y2 z2
x3 y3 z3
x4 y4 z4
x5 y5 z5
    .
    .
    .
```

FIG. 10

| Lens data ID | Availability time limit | Available usage number |
|---|---|---|
| aaa1 | 20100810 | 10 |
| bbb2 | 20091010 | None |
| ccc3 | None | 4 |
| ⋮ | ⋮ | ⋮ |

FIG. 18

| Lens design data identification information | Cumulative processing number | Maximum processing number | Date of first-time permission response |
|---|---|---|---|
| abc12345 | 2 | 4 | 20080620 |
| bca23456 | 10 | 20 | 20080601 |
| cab24567 | 20 | 20 | 20080620 |
| ... | ... | | ... |

LENS TREATMENT MANAGEMENT SYSTEM

RELATED APPLICATIONS

This is a U.S. national stage of application No. PCT/JP2009/004213, filed on Aug. 28,2009.

This application claims the priority of Japanese application no. 2008-221906 filed Aug. 29, 2008 and 2008-221907 filed Aug. 29, 2008, the entire contents of both of which are hereby incorporated by reference.

FIELD OF THE INVENTION

The present invention relates to a lens manufacturing equipment, a lens manufacturing system, a lens manufacturing method, a computer program, a lens design data utilization management system, a lens design data utilization management device, a lens processing management device, a lens processing management system, a lens design data utilization management program and a lens processing management program.

BACKGROUND OF THE INVENTION

In recent years, a system wherein a company with knowhow in optics design offers a lens design service to companies having no know-how in that field has been proposed (refer to Patent Document 1 below). The technique as disclosed in Patent Document 1 includes connecting over a network a terminal equipment of a lens manufacturer (company having no know-how in optics design) to a terminal equipment located at a design data provider side (company with know-how in optics design) and, in case of an agreement relating to supply design data, in having the design data provider transmit the design data over the network.

With regard to services using such a system, the company involved in optics design typically charges the company receiving the lens design on the basis of an additional payment for the number of lenses manufactured using said design. According to the system disclosed in Patent Document 1 for instance, price is calculated on the basis of a number of distributions as counted by a dedicated counting unit adapted for counting the number of lens design data distributions.

Furthermore, a communication system for globular shape machining data for eyeglasses is described in Patent Document 2 (see below), wherein a communication equipment of a lens processor which processes lenses for eyeglasses is connected over a network by means of a communication equipment to an eyewear store. Such a communication system for globular shape machining data of eyeglasses requires a technique by which the data relating to the type of lenses, etc. are transmitted from the store communication equipment so as to be displayed and outputted on the communication equipment of the lens processor having received those data.

Patent Document 1: Jpn. unexamined patent publication No. 2005-202291

Patent Document 2: Jpn. unexamined patent publication No. 2002-174800

In previous systems, companies having received lens shape data specifying lens shape from an optics design service for lenses were able to illicitly manufacture lenses without paying the price thereof to the optics designer through repeated usage of the same lens shape data, whereas optics designers found it difficult to identify such an abuse. Therefore, the companies involved in optics design have been facing the issue of not being able to recover the profits they were supposed to gain.

Moreover, the possibility for lens processors to duplicate lens design data although they have paid only for the design fee for one lens made it disadvantageous in the prior art in that such lens processors were likely to repeatedly process lenses in an illegal manner. For instance, the technique disclosed in Patent Document 2 suffers from the disadvantage of data duplicated and outputted on a communication equipment being used by lens processors to manufacture multiple lenses therefrom.

The prior art is also at risk of allowing lens processors to repeatedly process lenses in an illegal manner, as the lens designers who supply lens design data are unable to identify such abuses.

The prior art is also found to be disadvantageous in that the lens design data usage status cannot be appropriately managed, thus leading to a risk to have lenses processed illicitly using said lens design data.

SUMMARY OF THE INVENTION

One object of the present invention is to provide a technique allowing to appropriately manage lens processing using design data.

The lens processing management system according to one embodiment of the invention comprises a processing device adapted for processing lenses; a data supply device capable of supplying design data to the processing device; and a limiting means which restricts lens processing using the design data in the processing device.

The lens manufacturing system according to one embodiment of the invention comprises a processing unit adapted for processing lenses using the design data supplied from a data supply device; and a limiting means which restricts lens processing using the design data in the processing unit.

The lens manufacturing method according to one embodiment of the invention includes performing lens processing using design data supplied from a data supply device under a restriction placed thereupon.

The computer program according to one embodiment of the invention is provided for executing steps of lens processing using design data supplied from a data supply device under a restriction placed thereupon.

The lens processing management method according to one embodiment of the invention includes performing lens processing on a processing device using design data supplied by a data supply device under a restriction placed thereupon.

The lens manufacturing equipment according to one embodiment of the invention comprises a lens data storage unit adapted for storing lens data containing shape data thereof which represent lens shape and the number of times that the lens shape data can be used; a usage number storage unit adapted for storing the number of times that the lens shape data have been used; an access control unit adapted for reading out the number of times that the lens shape data have been used from the usage number storage unit and, if the number of times that the lens shape data have been used is lower than the number of times that the lens shape data can be used, reading out the number of times that the lens shape data can be used from the lens data storage unit, reading out the lens shape data from the lens data storage unit, then increasing by the number of times that the lens shape data have been used the usage number stored in the usage number storage unit; a lens shape data memory which stores the lens shape data read out by the access control unit; and a lens manufacturing unit adapted for manufacturing lens based on lens shape data stored in the lens shape data memory, then erasing the lens shape data therefrom after manufacture.

The lens manufacturing system according to one embodiment of the invention includes a lens manufacturing equipment and a management server capable of transmitting/receiving data to/from each other over a network, wherein the lens manufacturing equipment comprises a lens data storage unit adapted for storing in association with an identification information lens shape data representing the shape of a lens; a transceiver unit adapted for transmitting/receiving data to/from the management server over a network; an access control unit adapted for transmitting requests for lens shape data containing identification information to the management server through the transceiver unit and, in the case that a lens shape data usage permission information indicating to permit lens shape data usage is received from the management server through the transceiver unit, reading out from the lens data storage unit the lens shape data corresponding to the identification information; a lens shape data memory adapted for storing the lens shape data read out by the access control unit; and a lens manufacturing unit adapted for manufacturing lenses based on the lens shape data stored into the lens shape data memory, then erasing the lens shape data therefrom after manufacture, while the management server comprises a transceiver unit adapted for transmitting/receiving data to/from the lens manufacturing equipment over a network; an usage number storage unit adapted for storing in association with identification information thereof the number of times that the lens shape data have been used; an available usage number storage unit adapted for storing in association with identification information thereof the number of times that the lens shape data can be used; and an accessibility determination unit adapted for reading out from the usage number storage unit the number of times that the lens shape data corresponding to identification information contained in the request to use lens shape data received from the lens manufacturing equipment through the transceiver unit have been used, reading out from the available usage number storage unit the number of times that the lens shape data corresponding to the identification information can be used and, if the number of times that lens shape data have been used is lower than the available usage number thereof, transmitting the permission information to use lens shape data to the lens manufacturing equipment through the transceiver unit, then increasing by the number of times that the lens shape data have been used the usage number stored in the usage number storage unit.

The lens manufacturing equipment according to one embodiment of the invention comprises a lens data storage unit which stores in association with an identification information lens shape data representing the shape of a lens; a transceiver unit adapted for transmitting/receiving data to/from a management server over a network; an access control unit adapted for transmitting requests to use lens shape data containing identification information thereof to the management server through the transceiver unit and if, after availability usage of the lens shape data has been determined based on the available usage number and the number of times that the lens shape data stored in the server in association with identification information thereof have been used, the permission information for lens shape data usage which indicates to permit lens shape data usage is received from the management server through the transceiver unit, reading out the lens shape data corresponding to identification information thereof from the lens data storage unit; a lens shape data memory adapted for storing the lens shape data read out by the access control unit; and a lens manufacturing unit adapted for manufacturing lens based on the lens shape data stored in the lens shape data memory, then erasing the lens shape data therefrom after manufacture.

The lens manufacturing system according to one embodiment of the invention includes a lens manufacturing equipment and a management server capable of transmitting/receiving data to/from each other over a network, wherein the lens manufacturing equipment comprises a lens data storage unit adapted for storing in association with an identification information lens shape data representing a lens shape; a transceiver unit adapted for transmitting/receiving data to/from the management server over a network; an access control unit adapted for transmitting requests to use lens shape data containing identification information thereof to the management server through the transceiver unit, and reading from the lens data storage unit the lens shape data corresponding to the identification information; a lens shape data memory adapted for storing the lens shape data read out by the access control unit; and a lens manufacturing unit adapted for manufacturing lenses based on the lens shape data stored in the lens shape data memory, then erasing the lens shape data therefrom after manufacture, while the management server comprises a transceiver unit adapted for transmitting/receiving data to/from the lens manufacturing equipment over a network; an usage number storage unit adapted for storing in association with identification information thereof the number of times that the lens shape data have been used; and an usage number counting unit which, upon receiving a request to use lens shape data from the lens manufacturing equipment through the transceiver unit, increases by the number of times that the lens shape data have been used the usage number stored in the usage number storage unit in association with identification information contained in the received request to use lens shape data.

An embodiment of the invention may be specified as a lens manufacturing method performed by the aforementioned lens manufacturing equipment or lens manufacturing system. Also, an other embodiment of the invention may be specified as a computer program to cause a computer serve as a lens manufacturing equipment or a lens manufacturing system.

In an embodiment of the invention, the lens design data utilization management system includes a lens processing management device adapted for managing lens processing using lens design data and a lens design data utilization management device adapted for communicating with that lens processing management device, wherein the lens processing management device comprises an acknowledgment request for processing availability transmitting unit adapted for transmitting to the lens design data utilization management device an acknowledgment request for lens processing availability before processing a lens using lens design data; and a lens processing control unit adapted for controlling the lens processing operation in the case that a processing permission indicating that processing of a lens is permitted is received as a response to the acknowledgement request for processing availability transmitted by the acknowledgement request for processing availability transmitting unit, and wherein the lens design data utilization management device comprises a processing availability decision unit which decides toward an acknowledgment request for processing availability transmitted by the acknowledgement request for processing availability transmitting unit whether to permit or not processing of a lens based on information relating to lens design data usage status; and a processing availability response unit which transmits to the lens processing management device a processing permission response in the case that the processing availability decision unit has permitted lens processing.

In an embodiment of the invention, the lens processing management device which communicates with the lens design data utilization management device and manages lens processing using lens design data comprises an acknowledgment request for processing availability transmitting unit adapted for transmitting to the lens design data utilization management device, before a lens using lens design data may be processed, an acknowledgment request for processing availability; and a lens processing control unit adapted for controlling the lens processing operation in the case that a processing permission indicating that lens processing is permitted is received as a response to the acknowledgement request for processing availability transmitted by the acknowledgement request for processing availability transmitting unit.

In an embodiment of the invention, the lens design data utilization management device capable to communicate with the lens processing management device comprises a processing availability decision unit adapted for deciding whether to permit or not lens processing based on information relating to lens design data usage status toward an acknowledgment request for processing availability to acknowledge lens processing availability transmitted by the lens processing management device; and a processing permission response unit adapted for transmitting to the lens processing management device a processing permission response indicating that lens processing is permitted in the case that the processing availability decision unit has made a decision to permit lens processing.

One aspect of the invention relates to a lens processing management program adapted for causing a computer in the lens processing management device capable de communicate with the lens design data utilization management device and to manage lens processing using lens design data, to serve as an acknowledgment request for processing availability transmitting means adapted for transmitting to the lens design data utilization management device, before lens processing using lens design data may be performed, an acknowledgment request for processing availability to acknowledge availability of lens processing; and a lens processing control means adapted for controlling performance of lens processing in the case that a processing permission response indicating that lens processing is permitted has been received as a response to an acknowledgment request for processing availability transmitted to the lens design data utilization management device.

One aspect of the invention relates to a lens design data utilization management program adapted for causing a computer in the lens design data utilization management device capable to communicate with the lens processing management device to serve as a processing availability decision means adapted for deciding whether to permit or not lens processing based on information relating to the usage status of lens design data in response to an acknowledgment request for processing availability to acknowledge availability of lens processing transmitted from the lens processing management device; and as a processing availability acknowledgment request response means adapted for transmitting to the lens processing management device the processing permission response by which lens processing is permitted, in the case that the processing availability decision unit has decided to permit lens processing.

Through its embodiments, the present invention provides for appropriately managed lens processing using data.

BRIEF DESCRIPTION OF THE DRAWINGS

FIG. 3 is a schematic diagram illustrating an outline of lens data stored into the lens data storage unit.

FIG. 4 is a schematic diagram illustrating an outline of usage number data stored into the usage number storage unit.

FIG. 9 is a schematic diagram illustrating an outline of lens data stored into the lens data storage unit.

FIG. 10 illustrates an outline of a conditions table stored into the conditions storage unit.

FIG. 18 is a schematic diagram illustrating one example of a lens design data utilization information management table in a fourth embodiment.

DETAILED DESCRIPTION OF THE DRAWINGS

[First embodiment]

Figure 1:
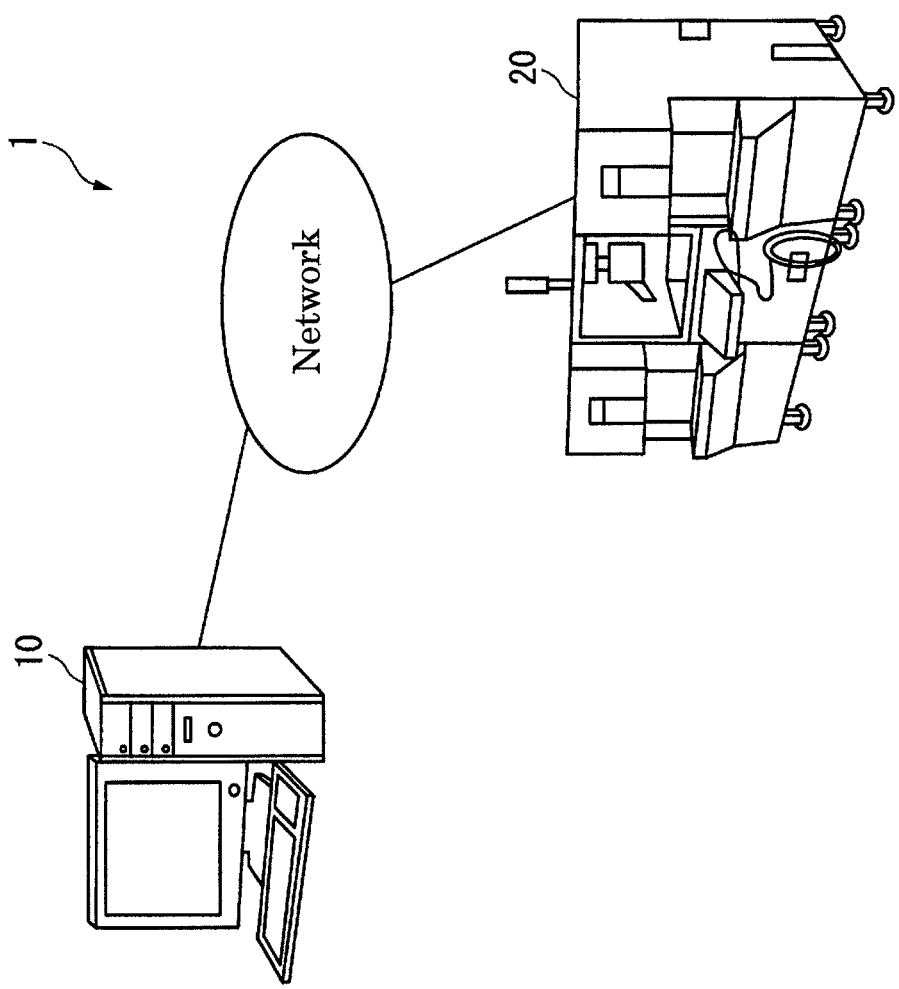
FIG. 1 is a functional block diagram illustrating the functional arrangement for the lens manufacturing system in a first embodiment.

FIG. 1 is a functional block diagram illustrating the functional arrangement for the lens manufacturing system 1 in a first embodiment. As illustrated, the lens manufacturing system (lens processing management system) 1 includes a design device (data supply device) 10 and a lens manufacturing equipment (processing device) 20, both being communicably connected over a network.

The design device 10 is owned by a designer having know-how in the field of lens designing who creates data for lens shape. On request from a lens manufacturer owning the lens manufacturing equipment 20, the design device 10 transmits to the lens manufacturing equipment 20, over the network, lens data (design data) including plane shape data which describe the shape of the lens surface which have been created (referred to as [lens shape data] in the invention).

Figure 2:
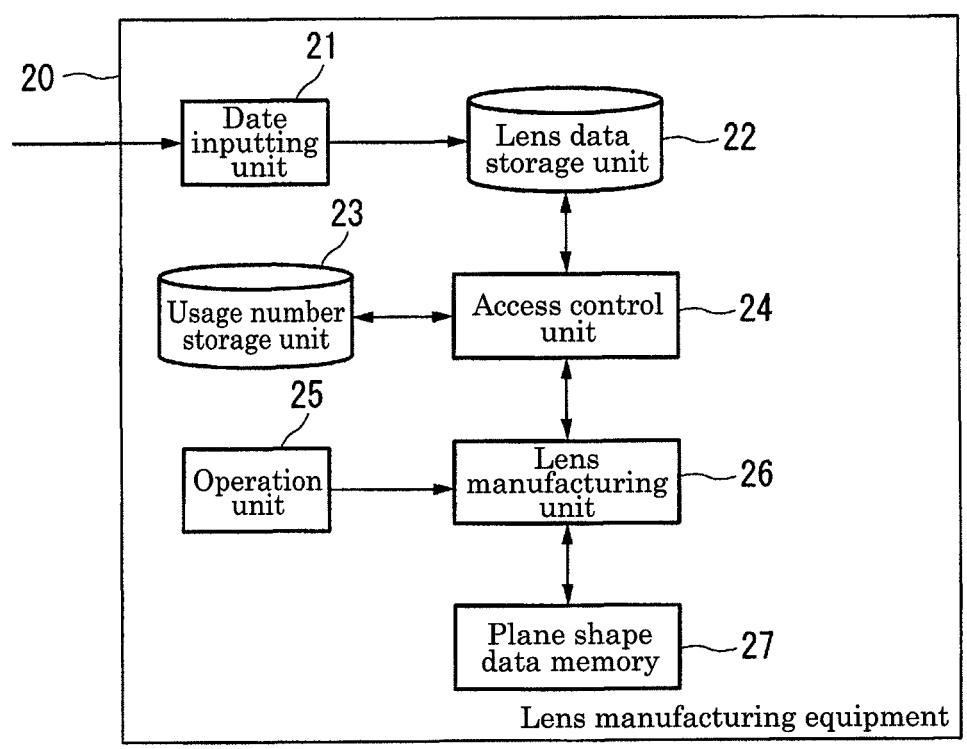
FIG. 2 is a functional block diagram illustrating the functional arrangement for a lens manufacturing equipment.

The lens manufacturing equipment 20 owned by a lens manufacturer manufactures eyeglasses lenses through processing of semi-finished products (semi-finished lenses) based on the plane shape data included in the lens data. FIG. 2 is a functional block diagram illustrating the functional arrangement for the lens manufacturing equipment 20. As shown, the lens manufacturing equipment 20 includes a lens data inputting unit 21, a lens data storage unit 22, a usage number storage unit 23, an access control unit (limiting means) 24, an operation unit 25, a lens manufacturing unit 26 and a plane shape data memory 27.

The lens data inputting unit 21 receives lens data from the design device 10 over a network and inputs the received data into the lens manufacturing equipment 20. The lens data storage unit 22 stores the lens data inputted by the lens data inputting unit 21. The lens data storage 22 unit may as well store a plurality of lens data.

The usage number storage unit 23 stores the number of times (usage number) that each lens data has been read by the access control unit 24 in association with lens data ID, namely the identification information of the lens data (referred to as [identification information] in the invention).

Upon a request from the lens manufacturing unit 26, the access control unit 24 reads out the plane shape data included in the lens data stored into the lens data storage unit 22 and transfers the read-out plane shape data to the lens manufacturing unit 26. In doing so, the access control unit 24 determines whether to read out the plane shape data, based on an availability time limit, an available usage number and an usage number. Treatment content of access control unit 24 will hereinafter be described in detail.

The operation unit 25 which mainly comprises a keyboard, a pointing device and buttons is operated by an operator to input into the lens manufacturing equipment 20 instructions for lens manufacturing and lens data ID of lens data used in lens manufacture.

The lens manufacturing unit 26 manufactures lenses by processing lens material such as semi-finished products in accordance with plane shape data included in lens data associated with the lens data ID inputted by the operation unit 25. The lens manufacturing unit 26 is adapted to be unable to directly read out plane shape data from the lens data storage unit 22.

The lens data memory 27 is a storage device capable to read and write data in connection with the lens manufacturing unit, into which are stored plane shape data read out by the access control unit 24.

FIG. 3 is a schematic diagram illustrating an outline of lens data stored into the lens data storage unit 22. Lens data includes lens data ID, availability time limit, available usage number and plane shape data.

Lens data ID is an identification information for each lens data, lens data and plane shape data being uniquely specified by such lens data ID.

The availability time limit represents the limit allowed for the lens manufacturing unit 20 to manufacture lenses using plane shape data from these lens data. Referring to FIG. 3, the value of such availability time limit is set to "20100810", which indicates that the lens manufacturing equipment 20 is not allowed to manufacture lenses using plane shape data from these data after 2010, Aug. 11.

The available usage number represents the number of times allowed to the lens manufacturing unit 20 to manufacture lens using plane shape data from these data. Referring to FIG. 3, the value of the available usage number is set to "5", which means that the lens manufacturing unit 20 is allowed to manufacture five lenses using plane shape data from these data.

The plane shape data include a set of values for spatial coordinates (x coordinate, y coordinate, z coordinate) of each point on the machined surface of the semi-finished products used in manufacture. Referring to FIG. 3, these data represent the spatial coordinates of each point on the machined surface of semi-finished products used in respective lens manufacturing, such as "x1, y1, z1" or "x2, y2, y2", etc. The lens processing unit 26 grinds out the machined surface of the semi-finished products so that the vertical coordinate in height for the points x1, y1 over the x-y plane thereof becomes z1, the desired lens being manufactured by carrying out this operation for all coordinates included in the plane shape data.

FIG. 4 is a schematic diagram illustrating an outline of the usage number data stored into the usage number storage unit 23. For each lens data ID, the usage number data is a record of the number of times (usage number) that these lens data have been read out by the access control unit 24. The value of the usage number is rewritten by the access control unit 24. The data shown in FIG. 4 indicate that lens data having lens data ID aaa1, lens data ID bbb2 and lens data ID ccc3 have been read ou ten times, five times and four times, respectively.

Figure 5:
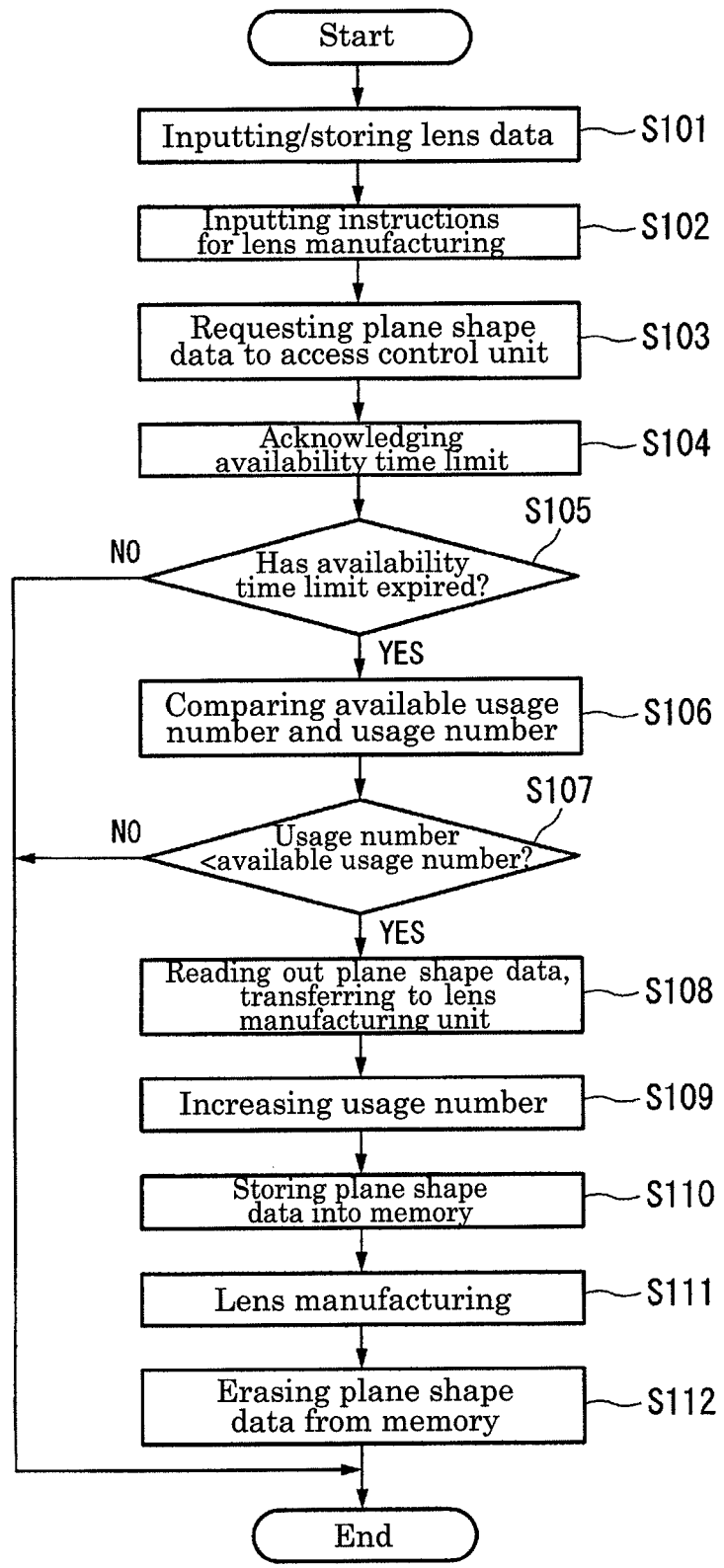
FIG. 5 is a flowchart showing the operational treatment of the lens manufacturing equipment.

FIG. 5 is a flowchart illustrating the operation treatment of the lens manufacturing unit 20. First, the lens data inputting unit 21 inputs lens data which then are stored into the lens data storage unit 22 (Step S101). Next, the operation unit 25 inputs instructions supplied by the operator to manufacture the lens along with the lens data ID (Step S102). Then, the lens manufacturing unit 26 requests the plane shape data to be used in lens manufacturing by transferring the inputted lens data ID to the access control unit 24 (Step S103).

Upon reception of lens data ID, the access control unit 24 reads out from the lens data storage unit 22 the availability time limit for plane shape data of lens data corresponding to this lens data ID and checks that deadline has not expired (Step S104). Specifically, the access control unit 24 acquires current date information from a non-illustrated timer and, by comparing the availability time limit to the current date information, checks whether the current date exceeds the availability time limit or not. If the limit has expired, that is in the case the current date exceeds the availability time limit (Step S105-NO), the access control unit 24 does not read out the plane shape data and outputs an error towards the lens manufacturing unit 26. Then, the lens manufacturing equipment 20 terminates all the operations shown in the flowchart of FIG. 5.

If the time limit has not expired, that is in the case the current date does not exceed the availability time limit (Step S105-YES), the access control unit 24 reads out from the lens data storage unit 22 the available usage number of plane shape data in lens data corresponding to the lens data ID, then reads out from the usage number storage unit 23 the usage number corresponding to the lens data ID. Next, the access control unit 24 compares the usage number to the read-out available usage number (Step 106). If the usage number is equal to or greater than the available usage number (Step S107-NO), the access control unit 24 outputs an error into the lens manufacturing unit 26 without reading out the plane shape data. Then, the lens manufacturing equipment 20 terminates all the operations shown in the flowchart of FIG. 5.

If the usage number is lower than the available usage number (Step S107-YES), the access control unit 24 reads out from the lens data storage unit 22 the plane shape data in the lens data corresponding to lens data ID and transfers to the lens manufacturing unit 26 the read-out plane shape data (Step S108). Then, the access control unit 24 accesses the usage number storage unit 23 and increases by one the value of the usage number corresponding to the lens data ID (Step S109).

Up on their reception from the access control unit 24, the lens manufacturing unit 26 writes the plane shape data into the plane shape data memory 27 (Step S110). Then, the lens manufacturing unit 26 performs the lens manufacturing based on the plane shape data thus stored into the plane shape data memory 27 (Step S111). Upon completion of lens manufacturing, the lens manufacturing unit 26 erases the plane shape data from the plane shape data memory 27 (Step S112), then ends the whole treatment of the flowchart as shown in FIG. 5.

With respect to the lens manufacturing equipment 20 as constituted in this way, the plane shape data stored into the lens data storage unit 22 are not directly read out by the lens manufacturing unit 26, but by the access control unit 24. The access control unit 24 evaluates as conditions if the available usage number has been exceeded and the availability time limit has expired and transfers to the lens manufacturing unit 26 the plane shape data read out from the lens data storage unit 22 only if a condition is met. As a result, this could deter illicit lens manufacturing by using plane shape data by the lens manufacturing unit 26 even if the available usage number is exceeded or in case of expired availability time limit.

Also, after a lens has been manufactured using plane shape data, the lens manufacturing unit 26 erases the plane shape data from the plane shape data memory 27 into which plane shape data have been stored. As a result, even when lens manufacturing is further performed using the same plane shape data, it is necessary to read out plane shape data from the lens data storage unit 22 after determination by the access control unit 24 that the aforementioned conditions have been met again. Thus, it would be possible to deter more strictly illicit manufacturing of lens by using plane shape data even if the available usage number is exceeded or in case of expired availability time limit.

Incidentally, such events in the course of the lens manufacturing process as occurrence of trouble of some kind or in-process defective lens (scratches, damages, etc.) may require to resume the manufacture. Thus, arrangements may be taken so as the available usage number of lens design data is not limited to one time only. Furthermore, orders are rarely got for lenses having exactly the same prescription within a period of few days and one may consider that manufacture is then performed once again because of a defective lens as aforementioned. As a result, even if an available usage number and an availability time limit are set, it would be possible to deter illicit manufacturing of lenses using plane shape data by the lens manufacturing unit 26.

VARIANT EXAMPLES

With reference to the lens manufacturing system 1, the lens data stored into the lens data storage unit 22 are transmitted from the design device 10 over a network and are received by the lens data inputting unit 21. However, the lens data stored into the lens data storage unit 22 do not necessarily have to be transmitted from the design device 10 over a network since they could be inputted into the lens manufacturing equipment 20 without involving a network, for instance by storing them onto a storage medium such as a CD-ROM or a semiconductor memory, then getting them on the ground of the lens manufacturing equipment 20 by means such as mailing or bringing in person and connecting them thereto.

With reference to the lens manufacturing system 1, plane shape data availability of the lens data is determined at the time of reading out based on two conditions relating to availability time limit and available usage number, but such a determination may be made on the basis of either one of these conditions only, whilst usage availability may also be determined on the basis of other conditions.

Also, the lens manufacturing system 1 could be arranged in such a way that the operation unit 25, upon instructions given by the operator with respect to the number of lenses to be manufactured, inputs the number of lenses to be manufactured into the lens manufacturing equipment 20, then the lens processing unit 26 transfers the lens data ID along with the number of lens to be manufactured to the access control unit 24. The access control unit 24 reads out only once the plane shape data from the lens data storage unit 22, transfers them to the lens manufacturing unit 26 and increases the usage number stored into the usage number storage unit 23 by only the number of manufactured lenses (referred to as [number of times that the lens shape data have been used] in the invention). After that, the lens manufacturing unit 26 manufactures the lenses for the number of lenses to be manufactured only, then erases the plane shape data from the plane shape data memory 27. In such an arrangement where the processing time needed for treatments such as reading out of the plane shape data by the access control unit 24 from the lens data storage unit 22, rewriting of the usage number stored into the usage number storage unit 23, transmitting of the plane shape data from the access control unit 24 to the lens manufacturing unit 26, writing of the plane shape data into the plane shape data memory 27 by the lens manufacturing unit 26 and erasing thereof, is reduced as compared with the case where manufacture is resumed for each lens to be manufactured when the access control unit 24 reads out the plane shape data, increases by one the usage number, then the lens manufacturing unit 26 manufactures one lens and erases the plane shape data from the plane shape data memory 27, thus making it possible to achieve a faster processing for the whole lens manufacturing equipment 20.

The availability time limit or the value for the available usage number may be set to "None" in the lens manufacturing system 1. As for lens data having the availability time limit or the value for the available usage number set to "None", the access control unit 24 does not determine whether the availability time limit has expired nor whether the usage number has exceeded the available usage number, but if other conditions are met, reads out the plane shape data from the lens data storage unit 22 and transfers them to the lens manufacturing unit 26.

With reference to the lens manufacturing system 1, the plane shape data stored into the plane shape data memory 27 are erased by the lens manufacturing unit 26 once the manufacture of a lens is finished, but such erasing may be performed by the access control unit 24.

With reference to the lens manufacturing system 1, only plane shape data describing the plane shape of a semi-finished product machined surface are used as data intended to describe the shape of lenses, but such data that describe lens thickness, the plane shape of the two faces of a lens or the shape of a semi-finished product to be used may be used as well.

Also, a computer program intended to run as the access control unit 24 the CPU (Central Processing Unit) provided in the lens processing device 20 may be inputted along with lens data from the data inputting unit 21. In such a case, the lens processing device 20 CPU which operates as the access control unit 24 by executing the computer program stored into the lens data storage unit 22 reads out the plane shape data therefrom upon request from the lens processing unit 26.

The plane shape data could also be arranged in such a way to be readable only by the access control unit 24. The lens data storage unit 22 may be configured too so as to be accessible from the access control unit 24 only.

The lens data can be transmitted to the lens manufacturing equipment 20 over a network after having been encrypted using an encryption key in the design device 10. And the encrypted lens data may be decoded using a decoding key in the lens manufacturing equipment 20. Incidentally, an arrangement can be done so that the encrypted lens data are decoded only within a predefined deadline and are automatically erased if the predefined deadline has expired. It may also include counting the number of uses of the decoding key.

[Second Embodiment]

Figure 6:
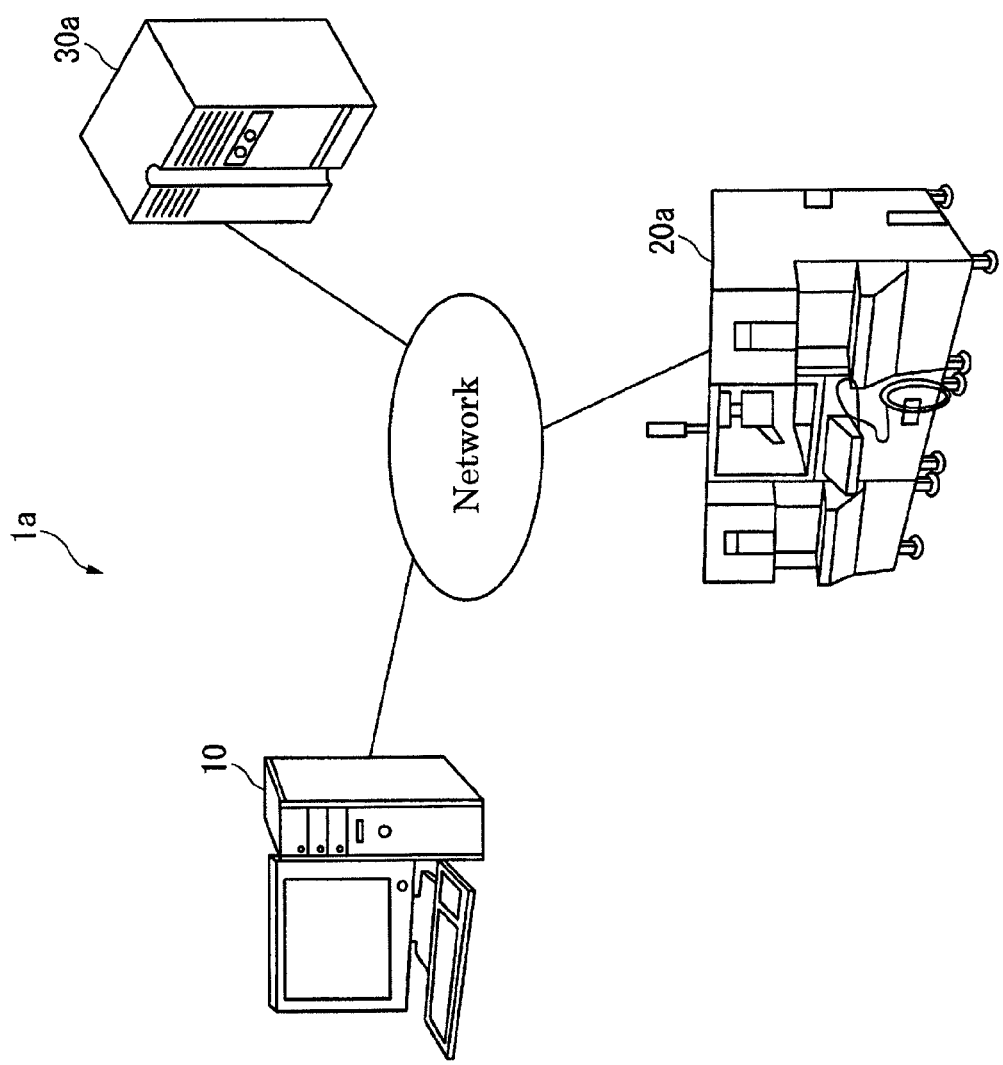
FIG. 6 is a functional block diagram illustrating the functional arrangement for the lens manufacturing system in a second embodiment.

FIG. 6 is a functional block diagram illustrating the functional arrangement for the lens manufacturing system 1*a* in a second embodiment. The lens manufacturing system 1*a* includes a design device 10, a lens manufacturing equipment 20*a* and a management server 30*a*.

The design device 10 is owned by a designer having know-how in the field of lens designing, involved in lens shape data creation. On request from a lens manufacturer owning the lens manufacturing equipment 20*a*, the design device 10 transmits to the lens manufacturing equipment 20*a*, over the network, the resulting lens data including plane shape data which describe the shape of the lens surface.

The lens manufacturing equipment 20*a* owned by a lens manufacturer receives the permission to access plane shape data of lens data by communicating over a network with a management server 30*a*, then manufactures eyeglasses lenses through processing of semi-finished products based on the plane shape data to which it has been allowed to access.

The management server 30*a*, upon request to access plane shape data by communicating over a network with the lens manufacturing equipment 20*a*, determines if accessibility exists, then sends back an accessibility response based on determination results.

Figure 7:
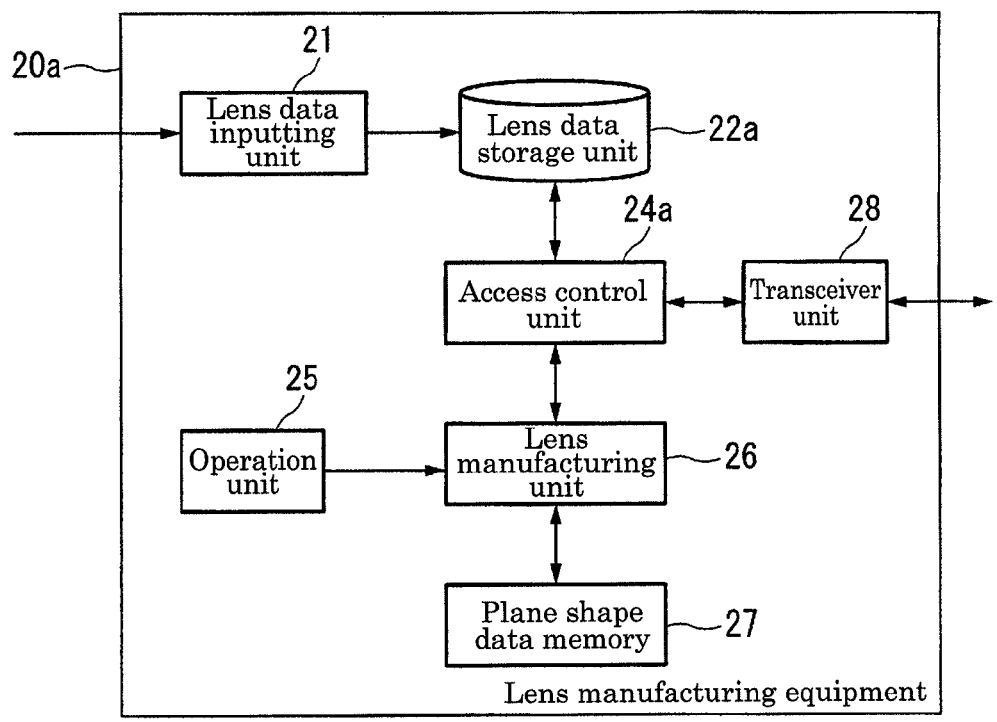
FIG. 7 is a functional block diagram illustrating the functional arrangement for the lens manufacturing equipment.

FIG. 7 is a functional block diagram illustrating the functional arrangement for the lens manufacturing equipment 20*a*. The same reference numerals as in FIG. 2 are affixed to the same functional parts in FIG. 7 as in the lens manufacturing equipment 20 of the first embodiment, whose description is therefore omitted. As shown, the lens manufacturing equipment 20*a* comprises a lens data inputting unit 21, a lens data storage unit 22*a*, an access control unit 24*a*, an operation unit 25, a lens manufacturing unit 26, a plane shape data memory 27 and a transceiver unit 28.

The lens data storage unit 22*a* stores lens data including lens data ID and plane shape data.

The access control unit 24*a* reads out plane shape data stored into the lens data storage unit 22*a* upon request from the lens manufacturing unit 26 and transfers the read-out plane shape data to the lens manufacturing unit 26. In doing so, the access control unit 24*a* creates a request to use plane shape data including lens data ID of plane shape data requested from the lens manufacturing unit 26 (referred to as [request to use lens shape data] in the invention), such request to use lens shape data being transmitted to the management server 30*a* by the transceiver unit 28. Then, the access control unit 24*a*, in the case that permission information to use plane shape data has been received from the management server 30, reads out the plane shape data corresponding to the lens data ID and transfers them to the lens manufacturing unit 26. Treatment content of access control unit 24*a* will hereinafter be described in detail.

The transceiver unit 28 constituted using a Network Interface Card (NIC) transmits/receives data to/from the management server 30*a* over a network.

Figure 8:
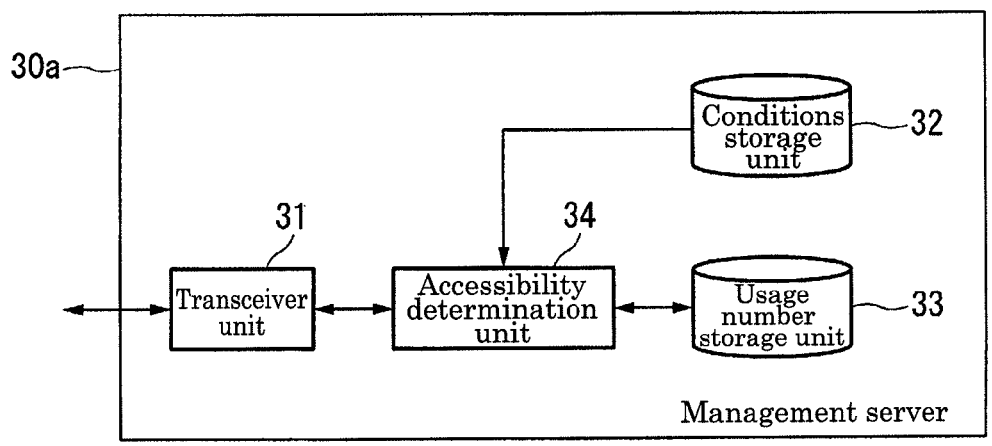
FIG. 8 is a functional block diagram illustrating the functional arrangement for the management server.

FIG. 8 is a functional block diagram illustrating the functional arrangement for the management server 30*a*. As shown, the management server 30*a* includes a transceiver unit 31, a conditions storage unit 32 (referred to as [available usage number storage unit] in the invention), a usage number storage unit 33 and an accessibility determination unit 34.

The transceiver unit 31 constituted using a network interface card or the like transmits/receives data to/from the lens manufacturing equipment 20*a* over a network.

The conditions storage unit 32 stores the available usage number and the availability time limit for each lens data, in association with lens data ID.

The usage number storage unit 33 stores the number of times that plane shape data of each lens data in association with lens data ID have been read out by the access control unit 24*a* (usage number).

The accessibility determination unit 34, upon request to use plane shape data from the lens manufacturing equipment 20*a*, determines whether to permit or not reading out of plane shape data, based on the availability time limit, the available usage number and the usage number thereof. Treatment of accessibility determination unit 34 will hereinafter be described in detail.

FIG. 9 is a schematic diagram illustrating an outline of lens data stored into the lens data storage unit 22*a*. The lens data stored into the lens data storing unit 22*a* includes data containing lens data ID and plane shape data. In the lens manufacturing system la of the second embodiment, the lens data stored into the lens data storage unit 22*a* have neither availability time limit nor available usage number since no determination related to the availability time limit and the available usage number is performed in the lens manufacturing equipment 20*a*.

FIG. 10 illustrates an outline of the conditions table stored in the conditions table unit 32. To each lens data ID are associated in the conditions table the availability time limit and the available usage number of the plane shape data included in lens data thereof. Specifically, the first line of the conditions table in FIG. 10 refers to an available usage number "10" and an availability time limit "201008010" associated with the lens data ID "aaa1". In that case, the available usage number of plane shape data contained in the lens data associated with the lens data ID "aaa1" is 10 and the availability time limit is 2010 Aug. 10.

Figure 11:
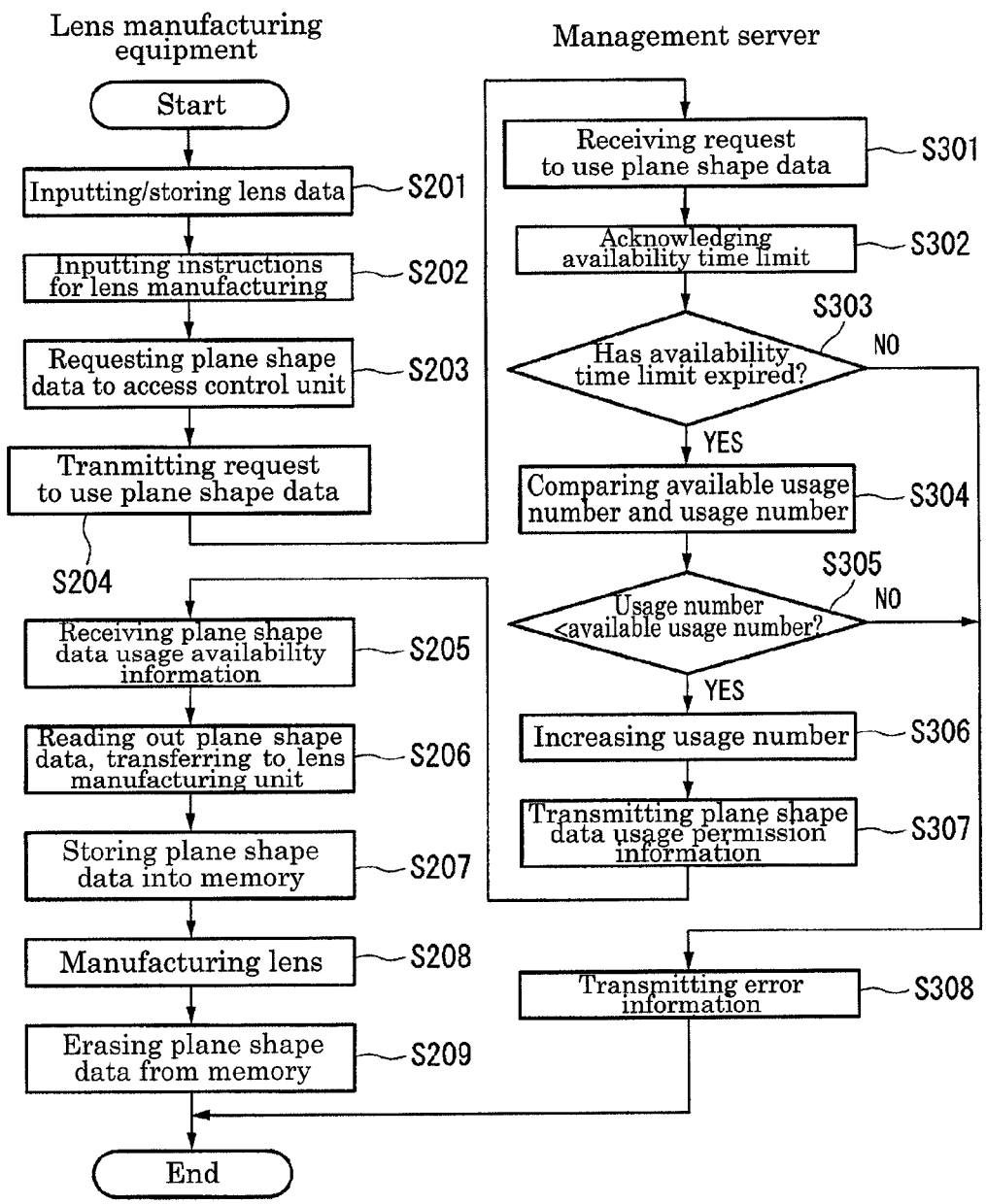
FIG. 11 is a sequential diagram illustrating the operational treatment of the lens manufacturing equipment and the management server in the lens manufacturing system.

FIG. 11 is a sequential diagram illustrating the operational treatment of the lens manufacturing equipment 20a and the management server 30a in the lens manufacturing system 1a. First, the lens data inputting unit 21 inputs the lens data and the inputted lens data are stored into the lens data storage unit 22a (Step S201). Then, the operation unit 25 inputs the instructions from operator to manufacture lens and the lens data ID (Step S202). Further, the lens manufacturing unit 26 requests the access control unit 24a to transfer the lens data ID for the plane shape data (Step S203).

Upon reception of the lens data ID, the access control unit 24a creates a request to use the plane shape data containing this lens data ID and transmits the resulting request to the management server 30a through the transceiver unit 28 (Step S204).

Up on reception of the request to use plane shape data from the transceiver unit 31 (Step S301), the accessibility determination unit 34 of the management server 30a reads out from the conditions storage unit 32 the availability time limit corresponding to the lens data ID contained in the request to use plane shape data and checks if the time limit has not expired (Step S302). Specifically, the accessibility determination unit 34 acquires the current date information from a non-illustrated timer being integrated to the management server 30a and, by comparing the availability time limit to the current date information, checks whether the current date exceeds or not the availability time limit. If the time limit has expired, that is in the case the current date exceeds the availability time limit (Step S303-NO), the access availability determination unit 34 transmits an error information towards the lens manufacturing equipment 20a (Step S308), thereby terminating the operations of the lens manufacturing system 1a as indicated in the sequential diagram of FIG. 11.

If the limit is not passed, that is in the case the current date does not exceed the availability limit (Step S303-YES), the access availability determination unit 34 reads out from the conditions storage unit 32 the available usage number corresponding to the lens data ID, then reads out from the usage number storage unit 33 the usage number corresponding to the lens data ID. Next, the accessibility determination unit 34 compares the usage number to the read-out available usage number (Step 106). In the case that the usage number is equal to or greater than the available usage number (Step S107-NO), the access control unit 24 outputs an error into the lens manufacturing unit 26 without reading out the plane shape data. Then, the lens manufacturing equipment 20 terminates all the operations indicated in the flowchart of FIG. 5.

In the case that the usage number is less than the available usage number (Step S305-YES), the accessibility determination unit 34 accesses the usage number storage unit 33 and increases by one the value of the usage number corresponding to the lens data ID (Step S306). Then, the accessibility determination unit 34 creates permission information to use plane shape data containing lens data ID (referred to as [lens shape data utilization permission information] in the invention), which is transmitted to the lens manufacturing equipment 20a from the transceiver unit 31 (Step S307).

Up on reception of the lens shape data utilization permission information by the transceiver unit 28 (Step S205), the access control unit 24a of the lens manufacturing equipment 20a reads out the plane shape data corresponding to the lens data ID from the lens data storage unit 22a and transfers read-out plane shape data to the lens manufacturing unit 26 (Step S206).

Upon reception of the plane shape data from the access control unit 24a, the lens manufacturing unit 26 writes them into the plane shape data memory 27 (Step S207). Then, the lens manufacturing unit 26 performs the manufacture of the lens based on the plane shape data stored into the plane shape data memory 27 (Step S208). Upon completion of lens manufacture, the lens manufacturing unit 26 erases the plane shape data from the plane shape data memory 27 (Step S209) and ends the whole treatment of the sequential diagram indicated in FIG. 11.

The lens manufacturing system 1a as arranged in such manner produces effects similar to those of the lens manufacturing equipment 20 in the first embodiment. In addition, the plane shape data usage number in the lens manufacturing system 1a is not stored in the lens manufacturing equipment 20a, but in the management server 30a wherein determination of usage availability takes place. As a result, compared to the case where the lens manufacturing equipment 20a itself stores the usage number of lens data and determines the usage availability thereof, it would be possible to deter more strictly illicit manufacturing of lens by using plane shape data even if the available usage number is exceeded or in case of expired availability time limit.

VARIANT EXAMPLES

The various variant examples according to the first embodiment may also be applied as well to the second embodiment.

Moreover, the design device 10 and the management server 30a in the lens manufacturing system 1a are set up as separate devices, but the two devices may as well be arranged so that they form a single device.

[Third Embodiment]

The lens manufacturing system of a third embodiment will be described hereinafter. The lens manufacturing system of the third embodiment whose network is of the same constitution as that of the lens manufacturing system 1a of the second embodiment, differs from the latter in that it is equipped with a lens manufacturing equipment 20b instead of the lens manufacturing equipment 20a and with a management server 30b instead of the management server 30a.

Figure 12:
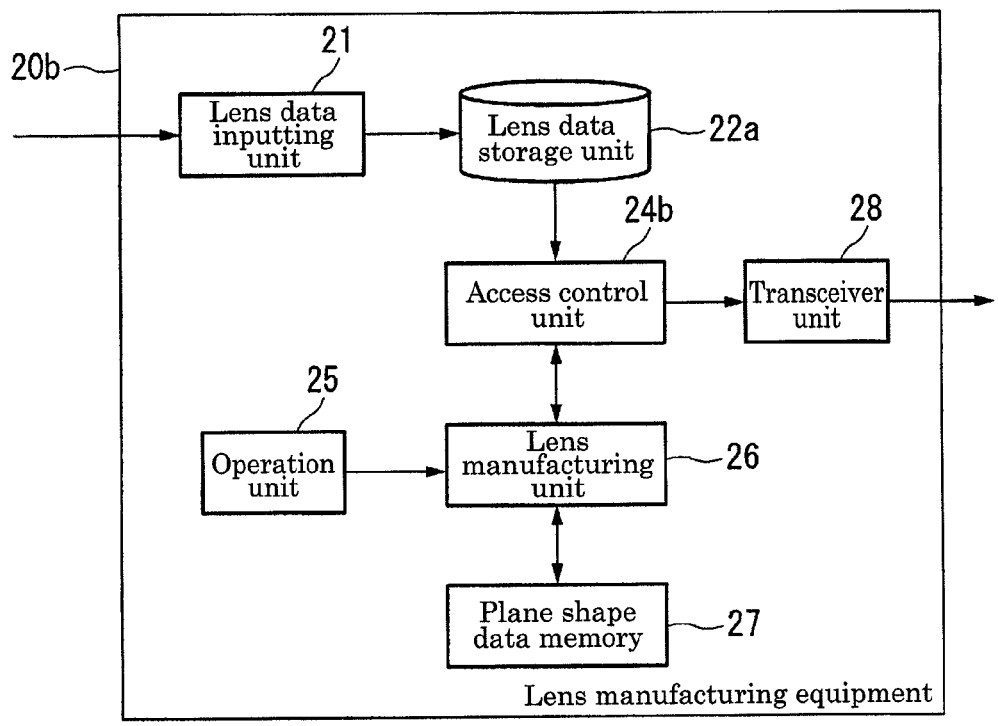
FIG. 12 is a functional block diagram illustrating the functional arrangement for the lens manufacturing system in a third embodiment.

FIG. 12 is a functional block diagram illustrating the functional arrangement for the lens manufacturing equipment 20b of the third embodiment. The lens manufacturing equipment 20b differs from the lens manufacturing equipment 20a in that it includes an access control unit 24b instead of the access control unit 24a, but is identical thereto with respect to other devices. The same reference numerals as in FIG. 7 are affixed to the same functional parts in FIG. 12 as in the lens manufacturing equipment 20a of the second embodiment, whose description is therefore omitted.

Up on a request from the lens manufacturing unit 26, the access control unit 24b reads out the plane shape data stored into the lens data storage unit 22a and transfers to the lens manufacturing unit 26 the read-out plane shape data. In doing so, the access control unit 24b creates a request to use plane shape data containing the lens data ID of the plane shape data requested from the lens manufacturing unit 26 and transmits to the management server 30b the request to use plane shape data through the transceiver unit 28. After that, the access control unit 24b reads out the plane shape data and transfers them to the lens manufacturing unit 26 with or without any reply from the management server 30b and regardless of the content thereof if any.

Figure 13:
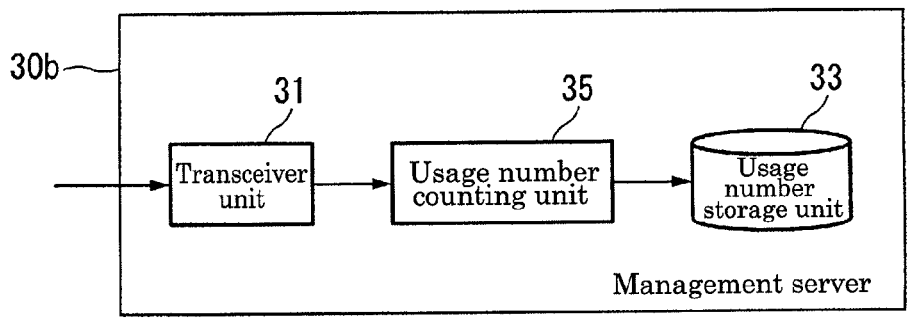
FIG. 13 is a functional block diagram illustrating the functional arrangement for the management server in a third embodiment.

FIG. 13 is a functional block diagram illustrating the functional arrangement for the management server 30b of the third embodiment. The management server 30b differs from the management server 30a in that it includes an usage number counting unit 35 instead of the accessibility determination unit 34, but is identical to the management server 30a with respect to other devices. The same reference numerals as in FIG. 8 are affixed to the same functional parts in FIG. 13 as in the management server 30a of the second embodiment, whose description is therefore omitted.

The usage number counting unit 35 increases the usage number stored into the usage number storage unit 33 correspondingly to the lens data ID contained in the request to use plane shape data received from the lens manufacturing equipment 20b.

Figure 14:
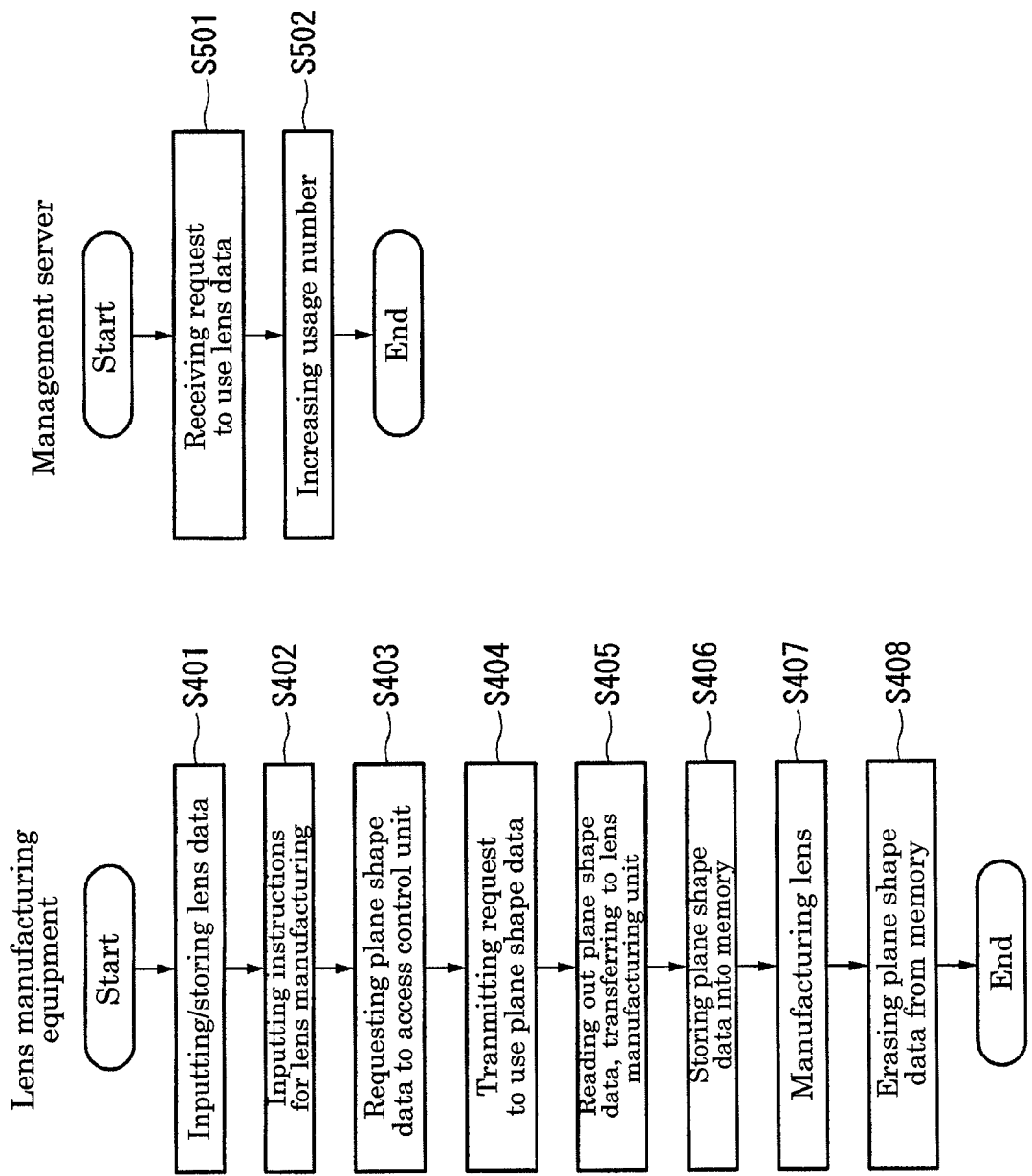
FIG. 14 is a flowchart showing the respective operational treatments of the lens manufacturing equipment and the management server in the lens manufacturing system.

FIG. 14 is a flowchart showing the respective operational treatments of the lens manufacturing equipment 20b and the management server 30b in the lens manufacturing system 1b. The operational treatment of the lens manufacturing equipment 20b will be first described.

Firstly, the lens data inputting unit 21 inputs lens data and the lens data storage unit 22a stores the inputted lens data (Step S401). Then, the operation unit 25 inputs the instructions for lens manufacture from the operator and the lens data ID (Step S402). Further, the lens manufacturing unit 26 requests the access control unit 24b to transfer the lens data ID for the plane shape data (Step S403).

Up on reception of the lens data ID, the access control unit 24b creates a request to use plane shape data containing this lens data ID and transmits it to the management server 30b through the transceiver unit 28 (Step S404). Then, the access control unit 24b reads out from the lens data storage unit 22a the plane shape data of the lens data corresponding to the lens data ID and transfers to the lens manufacturing unit 26 the read-out plane shape data (Step S405).

Upon reception of the plane shape data from the access control unit 24b, the lens manufacturing unit 26 writes these plane shape data into the plane shate data memory 27 (Step S406). Then, the lens manufacturing unit 26 performs lens manufacturing based on the plane shape data stored into the plane shape data memory 27 (Step S407). Upon completion of lens manufacturing, the lens manufacturing unit 26 erases the plane shape data from the plane shape data memory 27 (Step S408) and ends the whole treatment of the flowchart shown in FIG. 14.

The following description relates to the operational treatment of the management server 30b. Upon reception of a request to use plane shape data from the transceiver unit 31 (Step S501), the usage number counting unit 35 of the management server 30b accesses the usage number storage unit 33 and increases by one the value of the usage number corresponding to the lens data ID contained in this request to use plane shape data (Step S502), then ends the whole treatment of the flowchart shown in FIG. 14.

The lens manufacturing system 1b as constituted in such a manner does not use the conditions relating to availability of plane shape data and, in the lens manufacturing equipment 20b, the management server 30b counts the plane shape data usage number. Such an arrangement allows to accurately charge the lens manufacturer according to the number of times that the plane shape data have been used in the lens manufacturing equipment 20b. Moreover, it allows to deter a lens manufacturer from performing lens manufacturing illicitly using plane shape data.

The functions performed by the lens manufacturing equipments 20, 20a, 20b and by the management servers 30a, 30b in the aforementioned embodiments may well be achieved by means of computers. In that case, the programs to support each of these functions are recorded onto a recording medium and these recorded programs could be read into and executed on a computer system. Incidentally, when used herein, the term [computer system] embraces OS and hardware such as peripherals. Further, the term [computer-readable recording medium] refers to transportable media such as flexible disks, magneto-optical disks, ROM and CD-ROM as well as recording devices such as hard disks built into computer systems. Additionally, the term [computer-readable recording medium] may also refer to media dynamically holding programs for a short period of time as communication lines in case of transmitting programs over a network such as Internet or via a communication line such as telephone lines, as well as to media holding program for a given length of time as in volatile memories within those server and client computer systems. Said programs can also be intended for performing part of the aforementioned functions and likewise be capable of achieving these functions in combination with programs already recorded onto computer systems.

[Fourth Embodiment]

<About Lens Design Data Utilization Management System>

The following is a description in a fourth embodiment.

Figure 15:
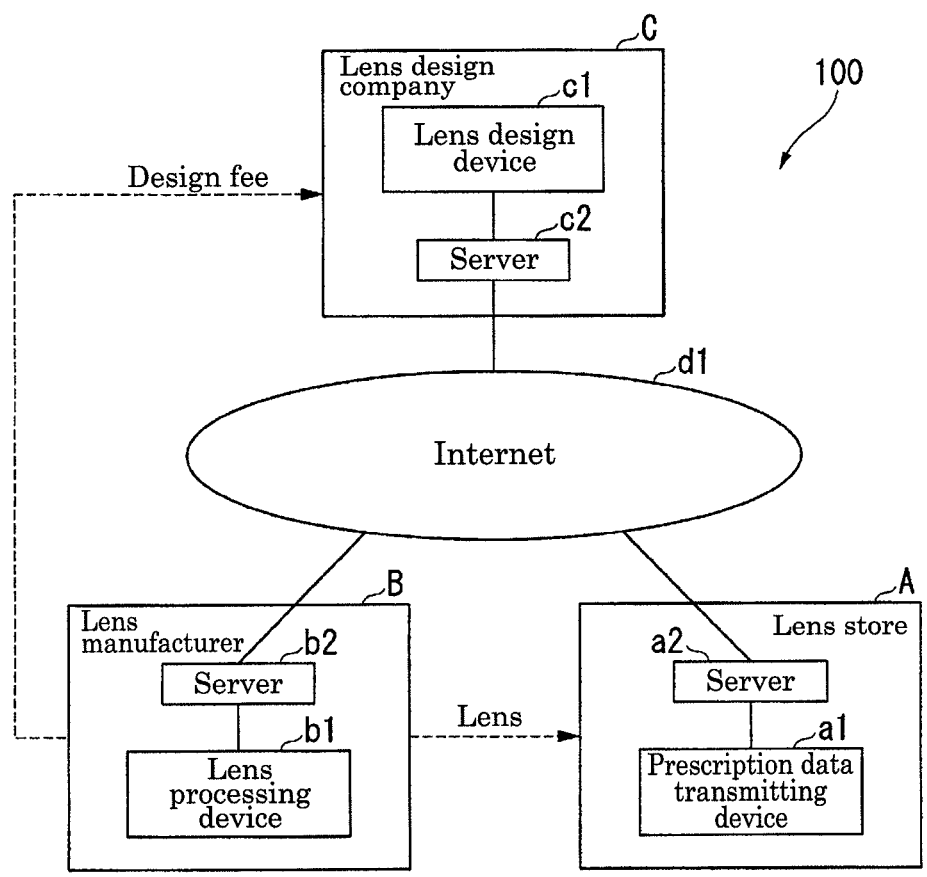
FIG. 15 is a conceptual diagram of the lens design data utilization management system in a fourth embodiment.

FIG. 15 is a conceptual diagram of the lens design data utilization management system (lens processing management system) 100 of the fourth embodiment.

In FIG. 15 are connected to the Internet d1 the server a2 managed by the store A such as an eyewear store, the server b2 managed by the lens manufacturer B processing and supplying stores with lens, and the server c2 managed by the lens design company C which performs design of lenses. FIG. 15 shows that the lens processing device b1 connected to the server b2 is able to communicate with the prescription data transmitting device a1 connected to the server a2 and with the lens design device (data supply device) c1 connected to the server c2.

In the present embodiment, the lens processing device b1 receives from the prescription data transmitting device a1 ordering data for placing an order for lenses and prescription data containing information regarding the visual acuity of the customer having been prescribed the lenses and frame shape of the eyeglasses, then transmits to the lens design device c1 the received prescription data. Also, the lens processing device b1 stores the design data for the lenses corresponding to the transmitted prescription data (hereinafter referred to as lens design data) as received from the lens design device c1.

In this way, the lens manufacturer B asks the lens design company C to design the lenses and pays the design fee for the provided lens design. Here, the design fee to be paid by the lens manufacturer B to the lens design company C is meant to be the design fee per lens to be processed. For instance, even when lenses are processed using the same lens design data, the lens manufacturer B is bound to pay to the lens design company C the design fee corresponding to the processing of one lens.

In the present embodiment, upon inputting of an instruction to process lenses using lens design data, the lens processing device b1, before performing such processing, transmits to the lens design device c1 a request to acknowledge processing availability, that is whether or not to process lenses using said lens design data. The lens design device c1 determines whether or not to permit lens processing toward the received request to acknowledge processing, then transmits to the lens processing device b1 the processing availability response as a result of the said determination.

In the case that the processing availability response received from the lens design device c1 gives permission to process the lenses (hereinafter referred to as processing permission response), the lens processing device b1 performs lens processing. Then, the processed lenses are delivered to the store A by the lens manufacturer B.

In that way, the lens design data utilization management system 100 allows to appropriately manage the lens design data usage status through determining whether lens processing is permitted or not toward a request to acknowledge processing availability received by the lens design device c1 from the lens processing device b1.

<About the Constitution of the Lens Processing Device b1>

The following is a detailed description of the lens processing device b1 and the lens design device c1.

Figure 16:
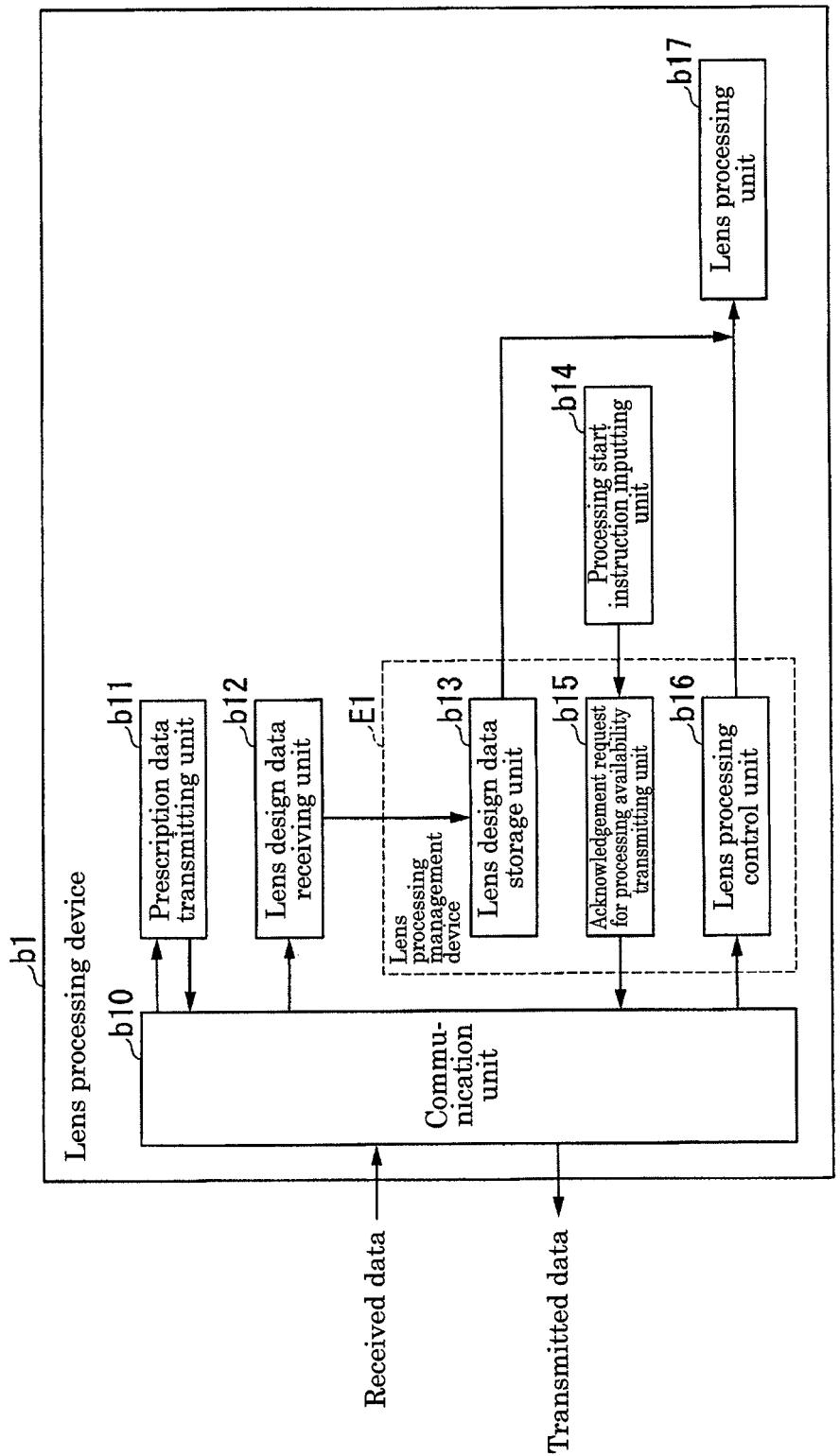
FIG. 16 is a schematic block diagram illustrating the arrangement for the lens processing device in a fourth embodiment.

FIG. 16 is a schematic block diagram illustrating how the lens processing device b1 of the present embodiment is constituted.

The lens processing device b1 is made up of a communication unit b10, a prescription data transceiver unit b11, a lens design data receiving unit b12, a lens design data storage unit b13, a processing start instruction inputting unit b14, an acknowledgement request for processing availability transmitting unit b15, a lens processing control unit b16 and a lens processing unit b17.

Incidentally, the lens design data storage unit b13, the acknowledgement request for processing availability transmitting unit b15 and the lens processing control unit b16 together form the lens processing management device E1. Moreover, FIG. 16 merely illustrates an outline of the arrangement related to the description of the present embodiment.

The communication unit b10 receives data via the server b2 in FIG. 15 from the prescription data transmitting device a1 and the lens design device c1. On the other hand, the communication unit b10 transmits data to the lens design device c1 via the server b2 in FIG. 15.

The prescription data transceiver unit b11 receives prescription data from the prescription data transmitting device a1 via the communication unit b10. On the other hand, the thus received prescription data are transmitted to the lens design device c1 via the communication unit b10 by the prescription data transceiver unit b11.

The lens design data receiving unit b12 receives lens design data from the lens design device c1 via the communication unit b10. The lens design data receiving unit b12 stores the received lens design data into the lens design data storage unit b13. Incidentally, the lens design data include identification information intended to identify said lens design data.

Also, the lens design data include at least one among information relating to, for instance, plane shape data such as aspherical surface, surfaces combining astigmatic surface and aspherical surface, progressive surface, surfaces combining progressive surface and astigmatic surface, surfaces combining progressive surface, astigmatic surface and aspherical surface as well as free-form surfaces producing a lens action as eyeglasses lenses when light passes through their front and back surfaces. The lens design data include also at least one among information relating to, for instance, blank material shape, refractive index of blank material, lens thickness, lens outside diameter and lens peripheral shape. The lens design data further include at least one among information relating to, for instance, lens S power, C power, axis, addition, prism and eccentricity.

Upon inputting of an instruction to start lens processing using lens design data according to an operation of the user, the processing start instruction inputting unit b14 outputs to the acknowlegment request for processing availability transmitting unit h15 a processing start instruction containing the identification information for said lens design data.

Upon inputting of the instruction to start lens processing outputted by the processing start instruction inputting unit b14, the acknowledgement request for processing availability transmitting b15 transmits to the lens design device c1, via the communication unit b10, a request to acknowledge processing availability containing identification information for said lens design data to confirm whether or not to process the lens using said design data.

More specifically, the acknowledgement request for processing availability transmitting unit b15 transmits to the lens design data utilization management device el a request to acknowledge processing availability so as to acknowledge whether or not to process the lens, before performing lens processing using lens design data.

Incidentally, the lens processing is performed on a lens-by-lens basis and the acknowledgement request for processing availability transmitting unit b15 transmits a request to acknowledge processing availability each time that an instruction to start processing of one lens is inputted.

The lens processing control unit b16 receives a lens processing availability acknowledgement response in response to the acknowledgement resquest for processing availability and determines whether the response indicates that lens processing is permitted or not. In the case that it has been determined to permit lens processing, the lens processing control unit b16 reads out from the lens design data storage unit b13 the lens design data corresponding to the lens design data identification information contained in the lens processing availability acknowledgement response. In that case, the lens processing control unit b16 outputs to the lens processing unit b17 the read-out lens design data along with the control information in order to start the lens processing on the lens processing unit b17.

More specifically, the lens processing control unit b16 carries out a control to perform lens processing when a processing permission response indicating that lens processing is permitted has been received as a response to the acknowledgement request for processing availability transmitted by the acknowledgement request for processing availability transceiver unit b15.

On the other hand, in the case that it has been determined not to permit lens processing as a result of the determination (hereinafter referred to as processing refusal response), the lens processing control unit b16 outputs into a monitor (not shown) an error message or the like indicating that lens processing cannot be achieved.

The lens processing unit b17, following the control information inputted from the lens processing control unit b16, processes the lens having the lens design data inputted from the lens processing control unit b16.

Figure 17:
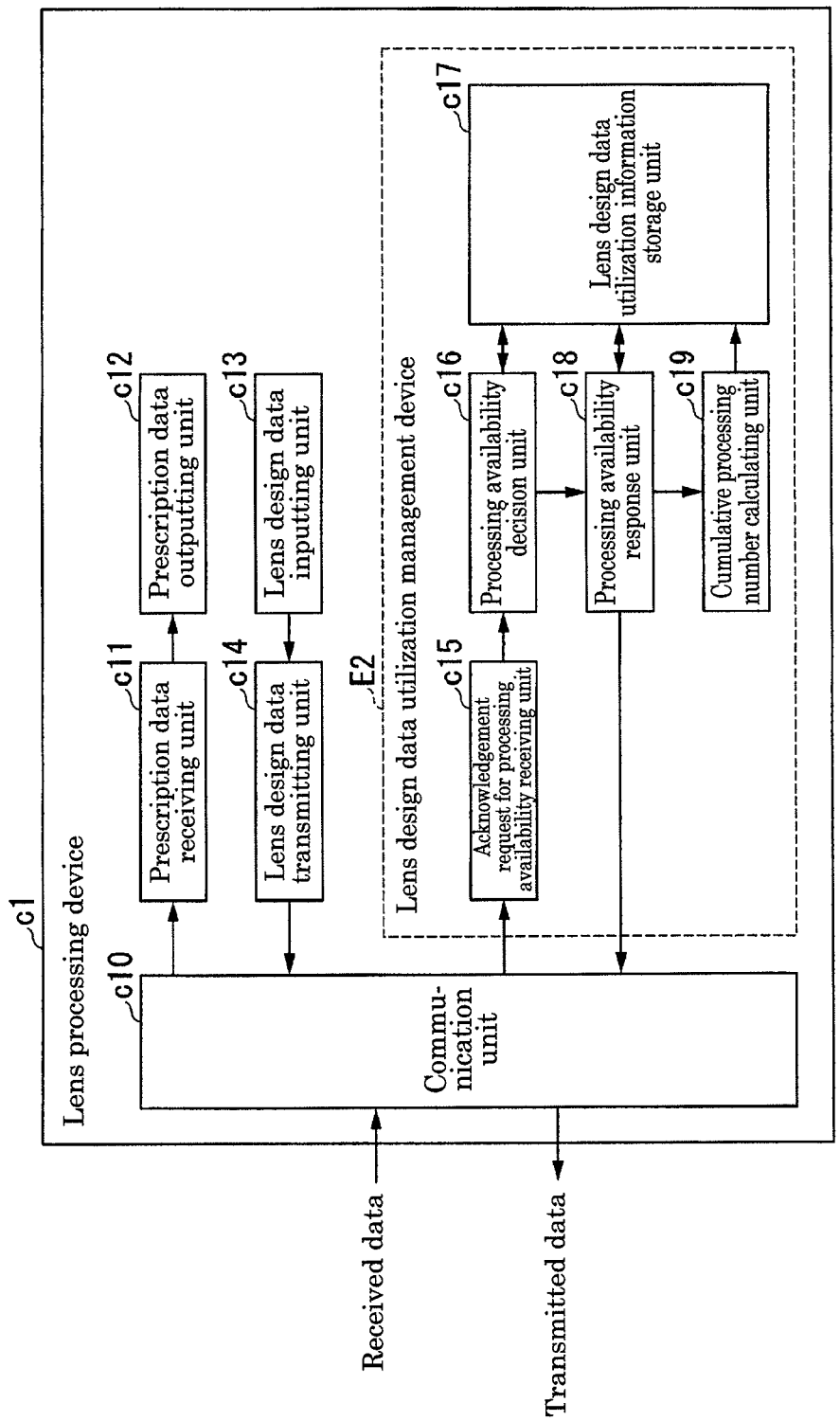
FIG. 17 is a schematic block diagram illustrating the arrangement for the lens design device in a fourth embodiment.

<About the constitution of the lens design device cl>FIG. 17 is a schematic block diagram illustrating the arrangement for the lens design device c1 of the present embodiment.

The lens design device c1 includes a communication unit c10, a prescription data receiving unit c11, a prescription data outputting unit c12, a lens design data inputting unit c13, a lens design data transmitting unit c14, an acknowledgement request for processing availability receiving unit c15, a processing availability decision unit c16, a lens design data utilization information storage unit c17 (first-time permission response date storage unit), a processing availability response unit c18 and a cumulative processing number calculating unit c19.

Incidentally, the acknowledgement request for processing availability receiving unit c15, the processing availability decision unit c16, the lens design data utilization information storage unit c17, the processing availability response unit c18 and the cumulative processing number calculating unit c19 together form the lens design data utilization management device E2. Moreover, FIG. 17 merely illustrates an outline of the arrangement related to the description of the present embodiment.

The communication unit c10 transmits/receives data to/from the lens processing device b1 via the server c2 in FIG. 15.

The prescription data receiving unit c11 receives prescription data from the lens processing device b1 via the communication unit c10 and outputs them into the prescription data outputting unit c12.

The prescription data outputting unit c12 outputs to an output equipment such as a monitor or a printer the prescription data inputted from the prescription data receiving unit c11.

Into the lens design data inputting unit c13 are inputted design information of a lens designed with respect to prescription data outputted by the prescription data outputting unit c12. The lens design data inputting unit c13 generates lens design data containing identification information in the inputted lens design information, then outputs the generated lens design data into the lens design data transmitting unit c14.

The lens design data transmitting unit c14 transmits the lens design data inputted from the lens design data inputting unit c13 to the lens processing device b1, via the communication unit c10.

The acknowledgement request for processing availability receiving unit c15 receives a resquest to acknowledge processing availability from the lens processing device b1 via the communication unit c10, then outputs into the processing availability decision unit c16 the lens design data identification information contained in the request to acknowledge processing availability and the reception date thereof.

The processing availability decision unit c16 reads out from the lens design data utilization information management table (FIG. 18) of the lens design data utilization information storage unit c17 the cumulative processing number corresponding to the lens design data identification information inputted from the acknowledgement request for processing availability receiving unit c15.

The processing availability decision unit c16 decides whether or not to permit lens processing using lens design data having the identification information contained in the request to acknowledge processing availability from the read-out cumulative processing number and the reception date of the request to acknowledge processing availability inputted from the acknowledgement request for processing availability receiving unit c15.

Incidentally, the cumulative processing number stored into the lens design data utilization information storage unit c17 refers to the number of lenses permitted to be processed by the processing permission response as calculated by the cumulative processing number calculating unit c19 to be hereinafter described. Moreover, the first-time permission response date stored into the lens design data utilization information storage unit c17 refers to the date at which the processing permission response has been given for the first time, as stored into the processing availability response unit c18 to be hereinafter described.

Below is a description of the decision method based on the maximum lens processing number using lens design data and of the decision method based on lens processing permission period.

<About the Decision Method Based on Maximum Lens Processing Number>

First, the processing availability decision unit c16 determines whether the read-out cumulative processing number falls within the maximum processing number as prememorized into the lens design data utilization information storage unit c17. In the case that, as a result of the determination, the cumulative processing number is greater than the maximum processing number, the processing availability decision unit c16 makes a decision not to permit processing of lens using lens design data.

On the other hand, if the cumulative processing number, as a result of the determination, falls within the maximum processing number, the processing availability decision unit c16 performs a determination based on lens processing permission period as follows.

<About the Decision Method Based on Lens Machinig Permission Period>

The processing availability decision unit c16 determines whether the reception date of the request to acknowledge processing availability inputted from the acknowledgement request for processing availability receiving unit c15 falls within the processing permission period being a predetermined period of time (20 days in the present embodiment) from the first-time permission response date, i.e. the initial date of the processing permission response stored into the lens design data utilization information storage unit c17.

In the case that, as a result of the determination, the reception date of the request to ackownledge processing availability is not within the processing permission period from the first-time permission response date, the processing availability decision unit c16 makes a decision not to permit lens processing using the lens design data. On the other hand, if said date, as a result of the determination, is within the permission response period from the received first-time permission response date to the request to acknowledge processing availability, the processing availability decision unit c16 makes a decision to permit lens processing using lens design data.

The processing availability decision unit c16 outputs into the processing availability response unit c18 the information whether to permit or not lens processing using said lens design data as decided along with the identification information of said lens design data.

That is, if the cumulative processing number calculated by the cumulative processing number calculating unit c19 to be hereinafter described does not exceed the prememorized maximum processing number, the processing availability decision unit c16 permits processing of lens using said lens design data. In the case that the reception date of the request to acknowledge processing availability falls within the prememorized period of time from the first-time response date of the processing permission response stored into the lens design data utilization information storage unit c17, the processing availability decision unit c16 permits processing of lens using said lens design data.

If the information inputted from the processing availability decision unit c16 indicates to permit lens processing, the processing availability response unit c18 delivers a processing permission response as processing availability response.

On the other hand, in the case that the information inputted from the processing availability decision unit c16 indicates not to permit lens processing, the processing availability response unit c18 delivers a processing refusal response as processing availability response.

The processing availability response unit c18 transmits to the lens processing device b1, via the communication unit c10, the processing availability response containing identification information of the lens design data as inputted from the processing availability decision unit c16. The processing availability response unit c18 outputs in the cumulative processing number calculating unit c19 the received information for the processing availability response.

Additionally, the processing availability response unit c18, for every identification information of lens design data contained in the information of the processing availability response, stores the initial transmission time as first-time permission response date into a lens design data utilization information management table in the lens design data utilization information storage unit c17. That is to say, the processing availability response unit c18, for each lens design data, stores the first-time response date of the processing permission response into the lens design data utilization information storage unit c17.

Moreover, the cumulative processing number calculating unit c19, in the case that the processing availability response is a processing permission response, reads out the cumulative processing number corresponding to the identification information contained in the information of the processing availability response (processing permission response) inputted from the processing availability response unit c18, which is the cumulative processing number stored into the lens design data utilization information storage unit c17. The cumulative processing number calculating unit c19 stores into a lens design data utilization information management table in the lens design data utilization information storage unit c17, as the cumulative processing number corresponding to said identification information, the cumulative processing number added with the number of lens (one lens in the present embodiment) whose processing is permitted as indicated by the information of the processing permission to the read-out cumulative processing number. That is, the cumulative processing number calculating unit c19 calculates the cumulative processing number for the processing number permitted by the processing permission response.

<About the lens design data utilization information management table>

Below is a description of the lens design data utilization information management table.

The lens design data utilization information management table is managed by a table base.

FIG. 18 is a schematic diagram illustrating one example of the lens design data utilization information management table according to the present embodiment. As shown, the lens design data utilization information management table relates to data arranged in a two-dimensional tabular form made of columns and rows for items including lens design data identification information, cumulative processing number, maximum processing number and lens processing permission acknowledgment response transmission date. This lens design data utilization information management table has the lens design data identification information as main key.

For instance, the data in FIG. 18 corresponding to a lens design data identification information [abc12345] indicates that the lens processing device b1 is cumulatively processing [2] (cumulative processing number) lenses using the lens design data [abc12345] and is permitted to cumulatively process up to [4] (maximum processing number) lenses using said lens design data. Again, the data in FIG. 18 corresponding to a lens design data identification information [abc12345] indicates that the date when the lens processing device b1 has been first permitted to process lens using lens design data is the first-time permission response date [2008, Jun. 20].

Also, the data in FIG. 18 corresponding to a lens design data identification information [bca23456] indicates, in the case that the date when the lens design device c1 has received a request to acknowledge lens processing permission is [2008 Jul. 1] for instance, that the first-time permission response date is not within the processing permission period (20 days) from [2008, Jun. 1]. In that case, the lens design device c1 would transmit a processing refusal response.

Furthermore, the data in FIG. 18 corresponding to a lens design data identification information [cab24567] indicates that the cumulative processing number and the maximum processing number are both [20] lenses. In that case, the lens design device c1 cannot permit to process no more lenses using lens design data [cab24567] and would transmit a processing refusal response.

<About the Operation of the Lens Design Data Utilization Management System>

Below is a description of how operates the lens design data utilization management system 100.

Figure 19:
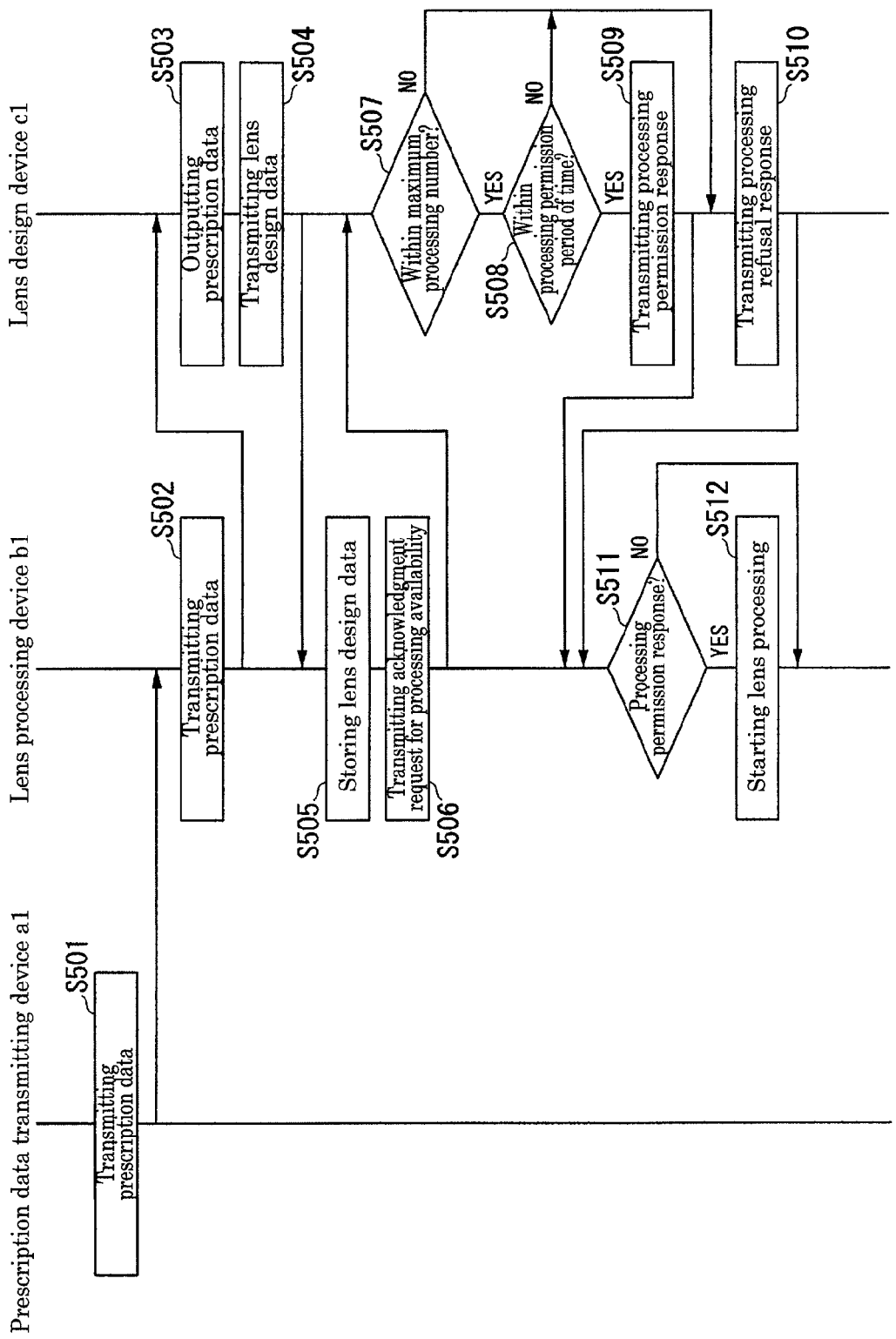
FIG. 19 is a flowchart illustrating the operation of the lens design data utilization management system in a fourth embodiment.

FIG. 19 is a flowchart illustrating the operation of the lens design data utilization management system 100 according to the present embodiment.

The prescription data transmitting device a1 transmits to the lens processing device b1 the ordering data and the prescription data to place an order for lenses (S501).

Upon reception at Step S501 of the prescription data transmitted by the prescription data transmitting device, the lens processing device b1 transmits the received prescription data to the lens design device c1 (S502).

Upon reception at Step S502 of the prescription data transmitted by the lens processing device b1, the lens design device c1 outputs the received prescription data toward a monitor, a printer or the like (S503).

Upon inputting of lens design data as designed toward the prescription data outputted at Step S503, the lens design device c1 transmits the lens design data to the lens processing device b1 (S504).

The lens processing device b1 receives and stores the lens design data transmitted by the lens design device c1 at Step S504 (S505).

Upon inputting of an instruction to start lens processing using the lens design data stored at Step S505, the lens processing device b1 transmits a request to acknowledge processing availability to the lens design device c1 (S506).

The lens design device c1 receives the request to acknowledge processing availability transmitted by the lens processing device b1 at Step S506, then performs the following determination.

The lens design device c1 determines whether the stored cumulative processing number is within the maximum processing number (S507). If the determination conducted at Step S507 specifies that the cumulative processing number indeed is within the maximum processing number (YES), the lens design device c1 performs the determination according to Step S508. If, on the other hand, the determination conducted at Step S507 specifies that the cumulative machine number is greater than the maximum processing number (NO), the lens design device 1c performs the treatment of Step S510.

The lens design device c1 determines whether the reception date of the request to acknowledge processing availability is within the processing permission period from the first-time permission response date (S508). If the determination conducted at Step S508 specifies that the reception date of the request to acknowledge processing availability is within the processing permission period from the first-time permission response date (YES), the lens design device e1 performs the treatment of Step S509. On the other hand, the lens design device e1 would perform the treatement of Step S501 if the determination conducted at Step S508 has shown that the reception date of the request to acknowledge processing availability is not within the processing permission period from the first-time permission response date (NO).

The lens design device 1c then transmits to the lens processing device hi a processing permission response as processing availability response (S509) or a processing refusal response as processing availability response (S510).

The lens processing device b1 determines whether the processing availability response received from the lens design device c1 is a processing permission response or not (S511). If the determination conducted at Step S511 specifies that the processing availability response is a processing permission response (YES), the lens design device e1 starts the lens processing using lens design data having the identification information contained in the processing availability response (S512). On the other hand, the lens design device c1 ends the treatment if the processing availability response was found to be a processing refusal response (NO) at Step S511.

Incidentally, the lens design device e1 here determines the content of the processing availability response on the basis of the cumulative processing number and the processing permission period (S507, S508), but the present invention is not limited thereto, since such determination can be performed by either of the two procedures.

In that way, according to the lens design data utilization management system 100 in the present embodiment, the lens processing management device b1, before performing the lens processing based on lens design data, decides whether to permit or not lens processing on the basis of information relating to cumulative processing number and first-time processing date (first-time permission response date) based on lens design data, whilst the lens processing management device controls performance of lens processing in the case that the lens design data utilization management device has decided to permit lens processing. Thus, it would be possible to appropriately manage the lens design data usage status and to prevent from illicitly processing lens using using said lens design data.

Also, according to the lens design data utilization management system 100 in the present embodiment, as the lens design data utilization management device c1 permits lens processing using said lens design data in the case that the aforementioned cumulative processing number does not exceed the aforementioned maximum processing number, preventing from illicitly processing lens using lens design data having exceeded the maximum processing number as set forth by contract or the like would be therefore possible. Moreover, the lens design data utilization management system 100 in the present embodiment makes it possible to appropriately manage the cumulative processing number since it is calculated by the lens design data utilization management device c1.

Furthermore, the lens design data utilization management system 100 in the present embodiment allows to prevent from illicitly processing lens using lens design data having exceeded the period of time set forth by contract or the like since the lens design data utilization management device c1 permits lens processing using said lens design data if the reception date of the request to acknowledge processing availability is within a prememorized period of time from the first-time response date of the processing permission response.

Incidentally, part of the lens processing device b1 according to the present embodiment, for example the acknowledgement request for processing availability transmitting unit b15 and the lens processing control unit b16, or part of the lens design device c1, for example the acknowledgement request for processing availability receiving unit c15, the processing availability decision unit c16, the processing availability response unit c18 and the cumulative processing number calculating unit c19 could be arranged in such a way to be achieved by computers. In that case, this can be done by storing onto a computer-readable recording medium programs for the achievement of these control functions, reading out in the computer system the programs thus stored onto such recording medium and executing them. Incidentally, when used herein, the term [computer system] embraces OS and hardware such as peripherals. Further, the term [computer-readable recording medium] refers to transportable media such as flexible disks, magneto-optical disks, ROM and CD-ROM as well as recording devices such as hard disks built into computer systems. Additionally, the term [computer-readable recording medium] may also refer to media dynamically holding programs for a short period of time as communication lines in case of transmitting programs over a network such as the Internet or via a communication line such as a telephone line, as well as to media holding program for a given length of time as in volatile memories within those server and client computer systems. Said programs can also be intended for performing part of the aforementioned functions and likewise be capable of achieving these functions in combination with programs already recorded onto computer systems.

[Fifth Embodiment]

Figure 20:
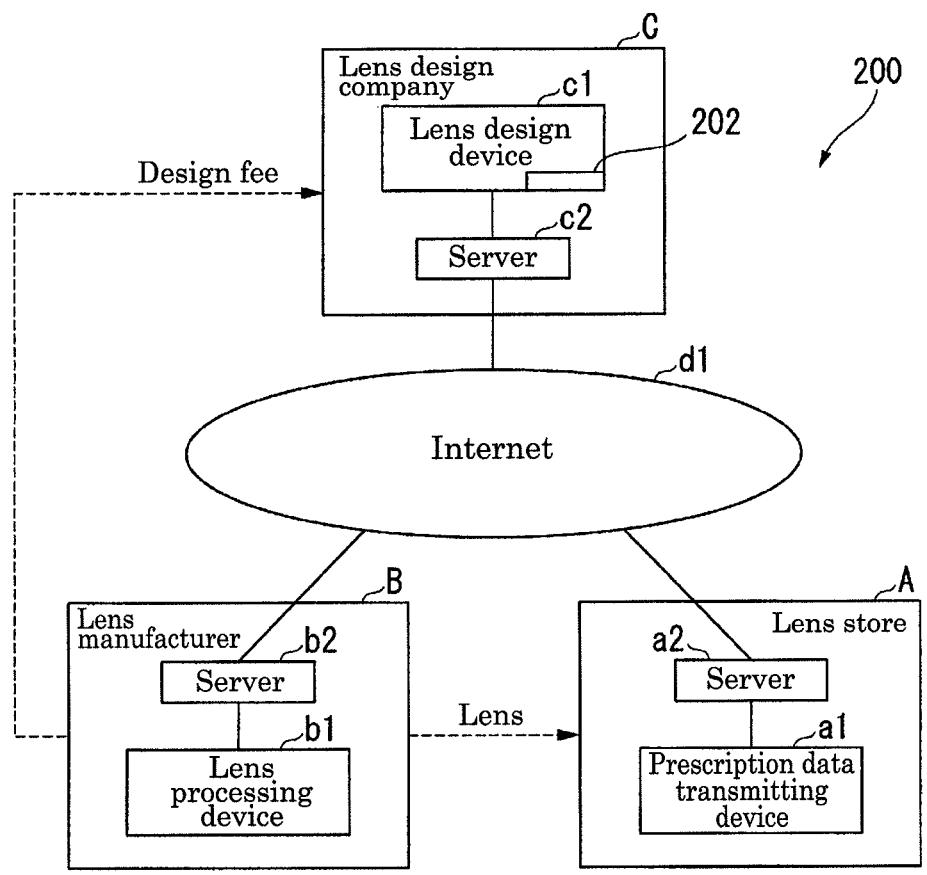
FIG. 20 is a schematic diagram illustrating the lens processing management system in a fifth embodiment.

The following is a description made with reference to FIG. 20 in a fifth embodiment. Description of the same components as in the above described embodiments will be omitted or simplified.

As shown in FIG. 20, the lens processing managing system (lens manufacturing system, lens design data utilization management system) 200 of the present embodiment is provided with a processing device for processing lens (lens manufacturing equipment) b1, a design device capable of supplying design data to the processing device b1 (data supply device) c1 and a control unit for controlling the flow of design data supplied from the design device c1 to the processing device b1 (limiting means, duplication limiting means) 202.

The control unit 202 of the present embodiment is located into the design device c1. Alternatively or additionally, the control unit 202 may be installed in the processing device b1 or another device. As may be necessary, design data are converted into a specific data format for transmission. Where appropriate, a specific computer program for design data transmitting or receiving is incorporated in the design device c1 and/or the processing device b1. The control unit 202 is capable of controlling the flow of design data supplied during the course of the lens processing treatment in the processing device b1. As for the control carried out by the control unit 202, for instance, the minimum design data necessary to a treatment at some point are supplied to the processing device b1 from the design device c1. Once the treatment is finished, the used design data are erased or rendered unreusable in the processing device b1. Consecutively, the minimum design data necessary to the following treatment are supplied from the design device c1 to the processing device b1. Alternatively or additionally, a specific computer program for data reception can be supplied from the design device c1 to the processing device b1 before design data transmission.

In the present embodiment, the design data partitioned into several pieces are supplied little by little from the design device c1 to the processing device b1. Alternatively, the whole design data can be supplied at a time from the design device c1 to the processing device b1 and be rendered erasable or unreusable after the treatement. Alternatively, the control can further be done so as to make used design data erasable or unreusable based on the usage number or the usage period of time.

In the present embodiment, duplication of design data transmitted to the processing device b1 is prevented. That is, processing of lens using used design data is restricted.

[Sixth Embodiment]

Figure 21:
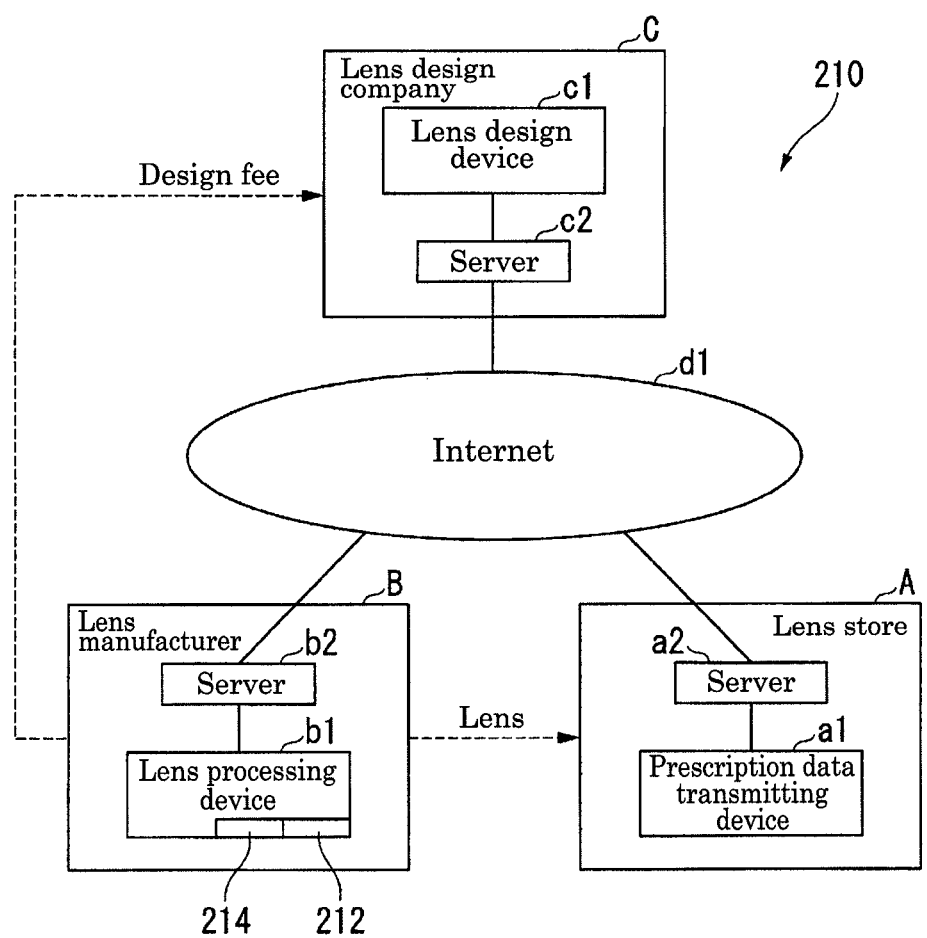
FIG. 21 is a schematic diagram illustrating the lens processing management system in a sixth embodiment.

The following is a description made with reference to FIG. 21 in a sixth embodiment. Description of the same components as in the above described embodiments will be omitted or simplified.

As shown in FIG. 21, the lens processing managing system (lens manufacturing system, lens design data utilization management system) 210 in the present embodiment is provided with a processing device for processing lens b1, a design device capable of supplying design data to the processing device b1 (data supply device) c1 and a record holding unit for holding a record of the operations performed by the processing device b1 (limiting means, record holding means) 212.

The record holding unit 212 of the present embodiment is located into the processing device b1. Alternatively or additionally, the record holding unit 212 may be installed in the design device c1 or another device. In the present embodiment, the record holding unit 212 records data representing each of the operations performed by the processing device b1 along the course of the processing treatment. The usage number of the design data, the usage period of time thereof, etc. could be recognize on the basis of a record (log) containing these recorded data.

In the present embodiment, as may be necessary, an accounting treatment unit 214 could be installed in the processing device b1 or another device. The accounting treatment unit 214 performs accounting treatment for the lens manufacturer B on the basis of records held in the record holding unit 212. For instance, the accounting treatment unit 214 claims from the lens manufacturer B payment of the design fee based on the usage number or the usage period of time of design data on the basis of records, or charges the design fee following the routine procedure.

In the present embodiment, the actual usage status of the design data is recognized on the basis of the records (log) of the processing device b1. Lens processing illicitly using design data is therefore restricted.

[Seventh Embodiment]

Figure 22:
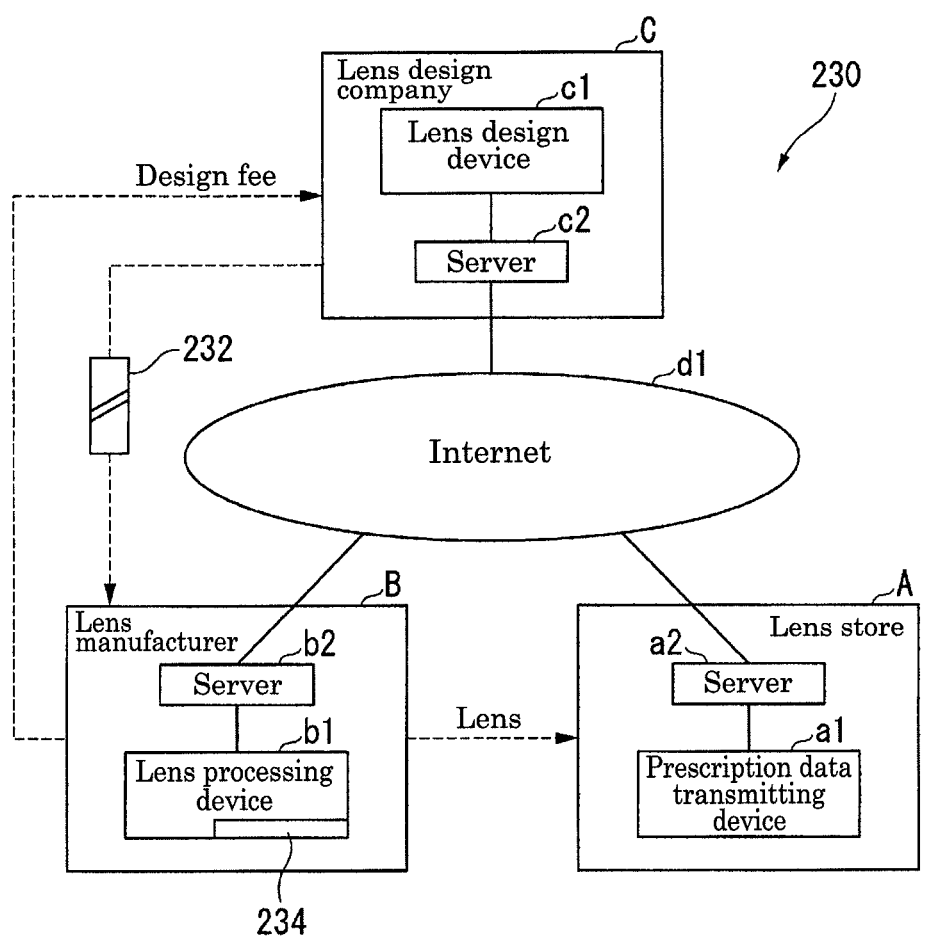
FIG. 22 is a schematic diagram illustrating the lens processing management system in a seventh embodiment.

The following is a description made with reference to FIG. 22 in a seventh embodiment. Description of the same components as in the above described embodiments will be omitted or simplified.

As shown in FIG. 22, the lens processing managing system (lens manufacturing system, lens design data utilization management system) 230 in the present embodiment is provided with a processing device for processing lens b1, a design device capable of supplying design data to the processing device b1 (data supply device) c1 and a portable media for managing the operations performed by the processing device b1 (limiting means, managing means, first medium) 230.

In the present embodiment, the processing device b1 is equipped with a media feeding device 234 which feeds the media 232. The feeding of the media 234 into the media feeding device 234 allows for processing lens using design data in processing device b1. The media 234 contains predetermined data relating at least to the usage number of design data and their usage period of time. Various types of media are applicable as media 232, for example cards (ID cards, prepaid cards, etc.), USB memory devices, etc. The media feeding device 234 allows the processing device b1 status to be switched over between a limiting status whereby processing of lens using design data is limited and a non-limiting status. The lens manufacturer B pays the fee to the lens design company C at least as compensation for the media 232.

In the present embodiment, data of the media 232 fed into the media feeding device 234 are rewritten by executing the processing treatment of lens using design data in the processing device b1. For instance, a given number (available usage number) is recorded in the initial media 232. As the processing treatment is performed, the number recorded in the media 232 comes down. When this number (available usage number) reaches zero in the processing device b1, the processing treatment using this media 232 would be unworkable.

In the present embodiment, performing an operational treatment using the media 232 at the time of lens processing with the processing device b1 would restrict lens processing illicitly using design data.

[Eighth Embodiment]

Figure 23:
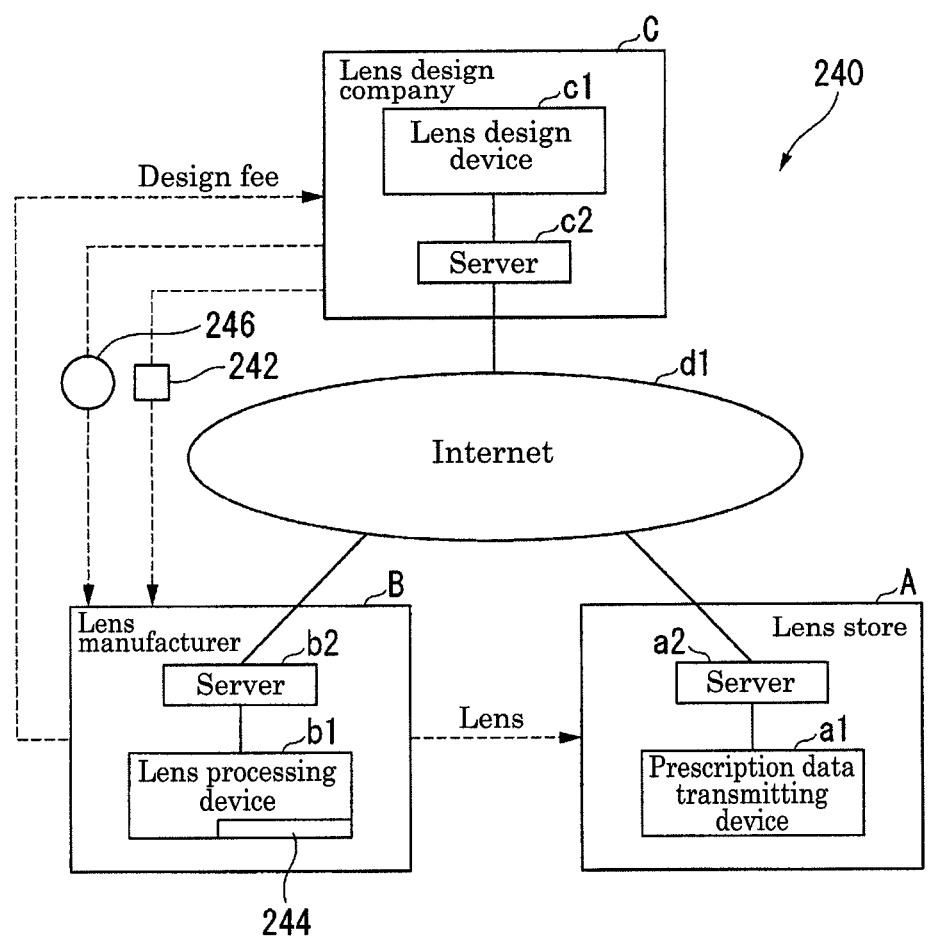
FIG. 23 is a schematic diagram illustrating the lens processing management system in an eighth embodiment.

The following is a description made with reference to FIG. 23 in an eighth embodiment. Description of the same components as in the above described embodiments will be omitted or simplified.

As shown in FIG. 23, the lens processing managing system (lens manufacturing system, lens design data utilization management system) 240 in the present embodiment is provided with a processing device for processing lens b1, a design device c1 whereby data for lens shape are created (design data, processing data) and a portable media with design data (processing data) written to it (data supply device) 242.

In the present embodiment, the processing device b1 is equipped with a readout device 244 which reads out data written to the media 242. The processing device b1 is capable to process lenses using design data read out from the media 242. Various types of media such as memory chips, CDs, etc. are applicable as examplary forms of media 242. Data saving onto other media from media 242 is prevented or duplication and illicit use of design data are restricted since media 242 is unduplicable. The lens manufacturer B pays the fee to the lens design company C at least as compensation for the media (design data) 242.

Additionally, the media 242 is transportable in an integrated manner with the half-finished lens 246. The lens manufacturer B pays the fee to the lens design company C at least as compensation for the half-finished lens 246 and the media (design data) 242.

Additionally, a media 242 with limits allowing design data to be used only once may be used. Such a media 242 can be for example an optical memory or a holographic memory chip. In the present example, associating one design data with one half-finished lens prevents using said design data for other half-finished lenses.

[Ninth Embodiment]

Figure 24:
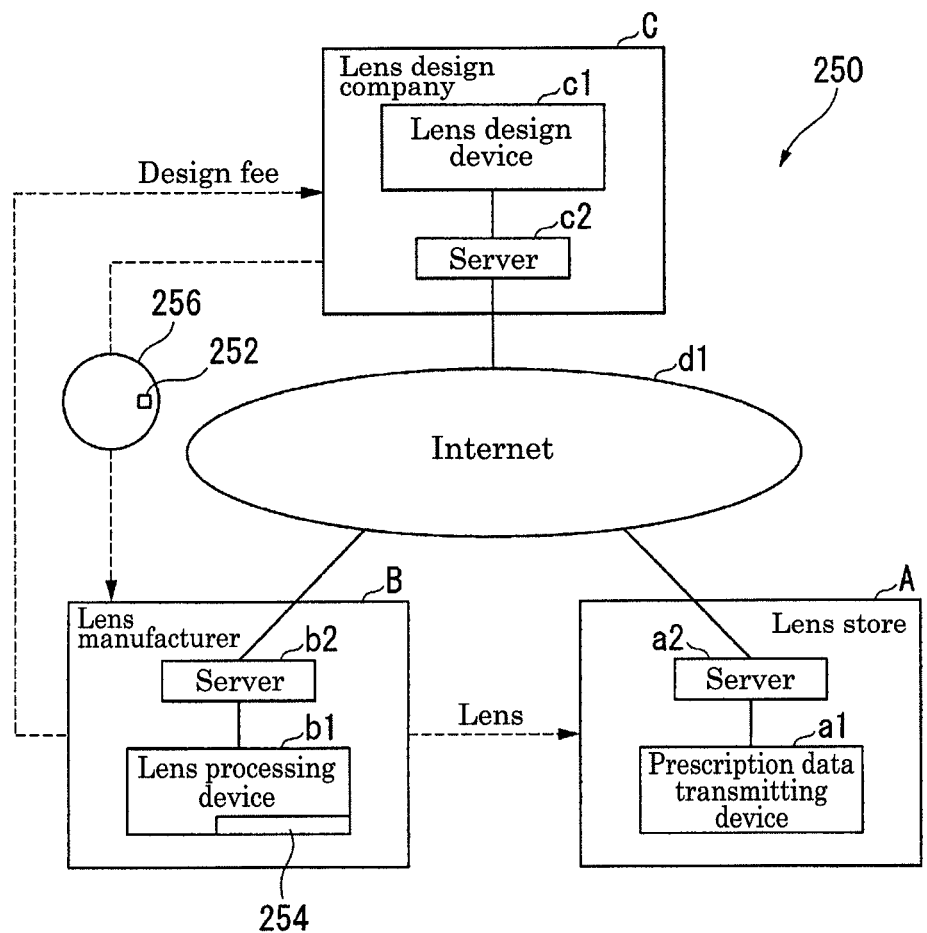
FIG. 24 is a schematic diagram illustrating the lens processing management system in a ninth embodiment.

The following is a description made with reference to FIG. 24 in a ninth embodiment. Description of the same components as in the above described embodiments will be omitted or simplified.

As shown in FIG. 24, the lens processing managing system (lens manufacturing system, lens design data utilization management system) 250 in the present embodiment is provided with a processing device for processing lens b1, a design device c1 creating data for lens shape (design data, processing data) and a portable media having design data (processing data) written to it (data supply device) 252.

In the present embodiment, the processing device b1 is equipped with a readout device 254 which reads out data written to the media 242. The processing device b1 is capable to process lenses using design data read out from the media 252.

In the present embodiment, the media 252 is embedded in the semi-finished lens 256. The lens manufacturer B pays the fee to the lens design company C at least as compensation for the semi-finished lens 256 and the media (design data) 252.

Various types of media such as memory chips are applicable as examplary forms of media 252. Embedding of the media 252 containing design data in the semi-finished lens 256 allows to associate one design data with one semi-finished product, thereby preventing these design data from being used in other semi-finished lenses. Additionally, it is possible to use a media 252 with limits allowing design data to be used only once. Such a media 242 could be for example an optical memory or a holographic memory chip. In the present example, illicit use of design data turns out to be more certainly prevented.

[Tenth Embodiment]

Figure 25:
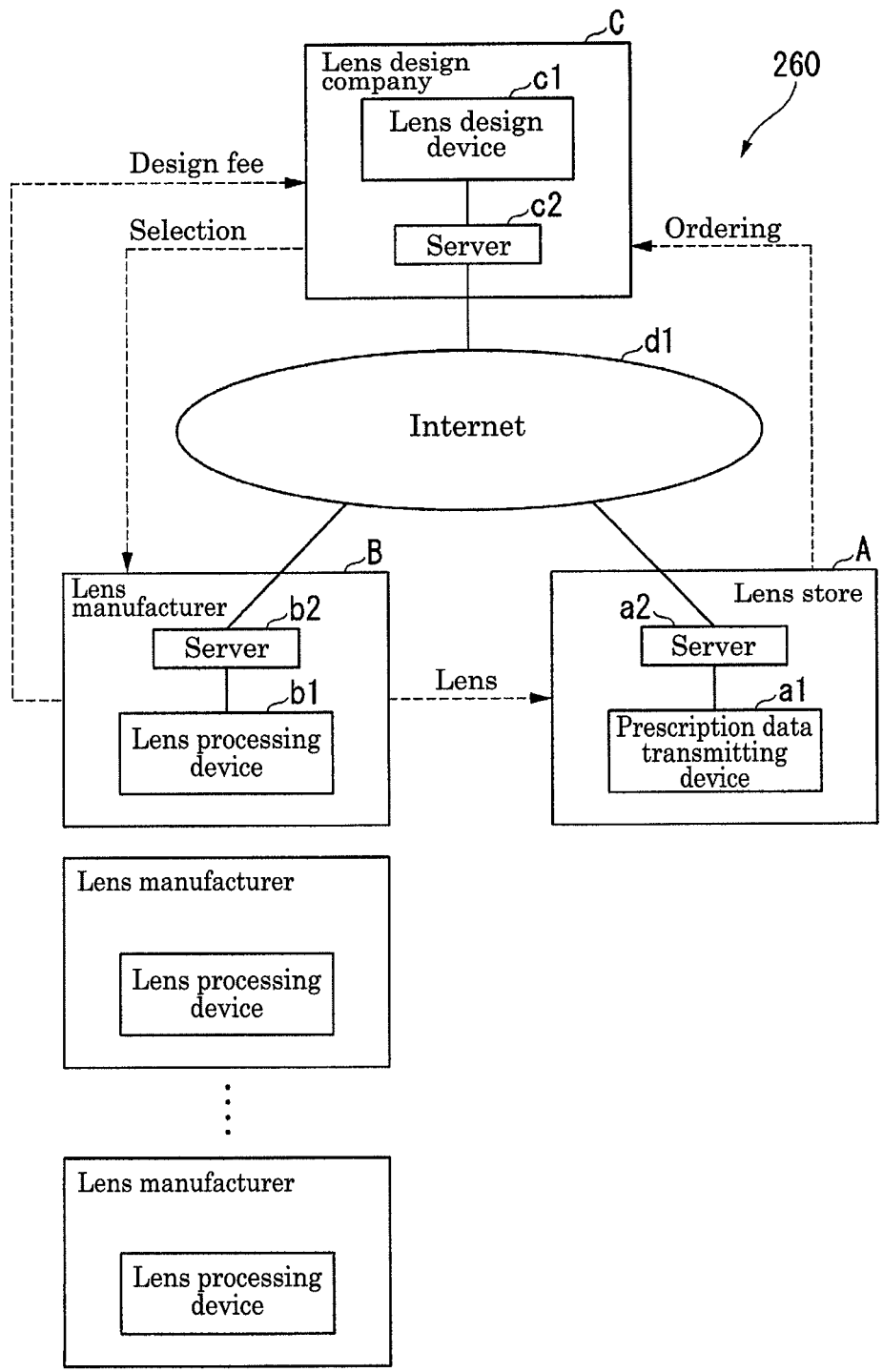
FIG. 25 is a schematic diagram illustrating the lens processing management system in a tenth embodiment.

The following is a description made with reference to FIG. 25 in a tenth embodiment. Description of the same components as in the above described embodiments will be omitted or simplified.

As shown in FIG. 25, the lens processing managing system (lens manufacturing system, lens design data utilization management system) 260 in the present embodiment is provided with a plurality of lens manufacturers owning a processing device for processing lens b1, a lens design company C owning design device c1 to create lens shape data (design data, processing data) and a lens store A selling lenses.

In the present embodiment, lenses are directly ordered by the lens store A to the lens design company C. The lens design company C, based on particular routine procedures thereof selects one lens manufacturer B from the plurality thereof. Thus, the lens design company C supplies this lens manufacturer B with the design data. The lens manufacturer B performs lens processing using design data. The finished lenses are then supplied by the lens manufacturer B to the lens store A. Alternatively, the finished lenses can be supplied by the lens manufacturer B to the lens store A via the lens design company C.

In the present embodiment, the lens design company C is able to collect information relating to the possibility of an illicit use by the lens manufacturers and retain them in a data base. For instance, based on such information in the data base (selecting means), performing of a lens manufacturer selection task would be possible. Selecting lens manufacturers by the lens design company allows to restrict the illicit use of design data by lens manufacturers.

[Eleventh Embodiment]

Figure 26:
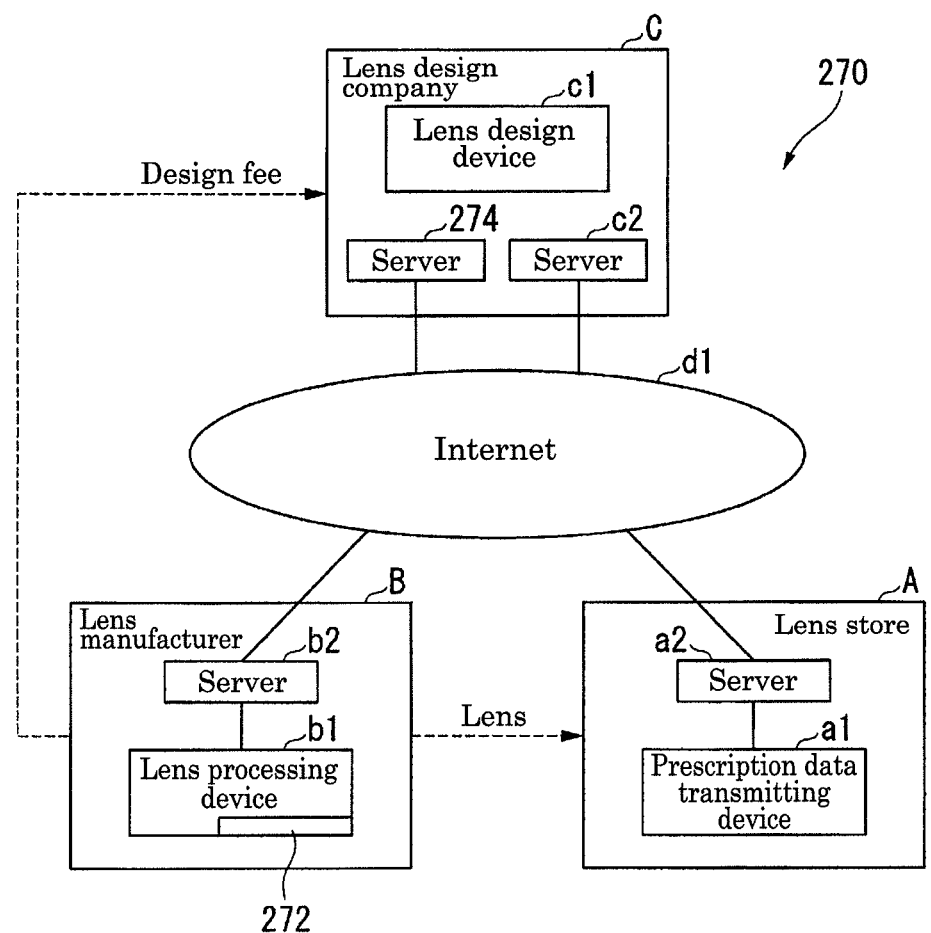
FIG. 26 is a schematic diagram illustrating the lens processing management system in an eleventh embodiment.

The following is a description made with reference to FIG. 26 in an eleventh embodiment. Description of the same components as in the above described embodiments will be omitted or simplified.

As shown in FIG. 26, the lens processing managing system (lens manufacturing system, lens design data utilization management system) 270 in the present embodiment is provided with a processing device for processing lens b1, an optical design unit which creates lens shape data relating to optical design (design data, processing data) 272 and a server 274.

In the present embodiment, the optical design unit 272 is located into the processing device b1. An example of the optical design unit 272 is a specific computer program, held in a media, a device, a memory or the like. The server 274 holds information relating to optical design as necessary. The optical design unit 272 seeks permission for optical design (or lens processing) from the server 274. The optical design unit 272 having been thus permitted is able to perform the lens optical design via the server 274 where appropriate. The processing device b1 can process lenses using design data from optical design unit 272.

In the present embodiment, the lens manufacturer B pays the fee to the lens design company C at least for one among the usage number of the server 274 (number of optical designs) and the quantity of lenses processed by the processing device b1. Additionally, the operation of the processing device b1 could be managed using a media (prepaid card) similar to that described with reference to FIG. 23.

In the present embodiment, processing of lens illicitly using design data is restricted since permission must be obtained from the server 274 at the time of lens designing or lens processing.

Concrete features of the invention are not limited to disclosed embodiments described herein in detail and various design modifications and variations can be made without departing from the scope thereof.

For instance, the lens design data may be transmitted to the processing device over a network once encrypted using an encryption key onto the data supply device. The lens design data thus encrypted may be decrypted using a decryption key onto the processing device. Incidentally, the encrypted lens design data can be arranged in such a way that the decryption treatement only takes place within a preliminarily defined period of time or to be automatically erased when a predetermined deadline has expired. Moreover, it may also be arranged so that to count the number of uses of the decryption key.

In addition to plane shape for processing semi-finished materials (semi-finished products), the lens design data could otherwise be arranged so that to contain information relating to which semi-finished material to use among a plurality of types thereof. As may be necessary, they could also be arranged in such a way that they include as data for processed lens quality verification, shape information such as center thickness, edge thickness, outside diameter, etc. of lenses as well as information on lens power to be used when checking lens refractive power using a lens power measurement system or the like.

The lens design data may also be arranged so as to contain, among the two faces of a lens, plane shape data of the front face, plan shape data of the back face or plan shape data of both back and front face. The plane shape data could include a set of points (set of values of spatial coordinates (x coordinate, y coordinate, z coordinate) for each point on the processed face of semi-finished materials) or may correspond to plane-interpolated data from plane shape data including a set of points, or even plane-interpolated data converted into a NC processing program.

The system described may also be arranged in such a way that lenses are directly ordered by a lens store to the lens design company, which in turn would supply the design data to the lens store. Then, the lens store supplies the design data to a lens manufacturer, who will perform lens processing using design data. The finished lenses are supplied to the lens store by the lens manufacturer.

No type restriction is specified for the lenses and the aforementioned embodiments could be applied to single vision lenses, progressive power lenses, progressive lenses for middle/near vision, progressive lenses for near/near vision, etc.

In an embodiment of the invention, the lens manufacturing equipment is equipped with a lens data storage unit adapted for storing data including lens shape data which represent the shape of a lens and the number of times that the lens shape data can be used, a usage number storage unit adapted for storing the number of times that the lens shape data have been used, an access control unit adapted for reading the number of time that the lens shape data have been used from the usage number storage unit, reading out the number of times that the lens shape data can be used from the lens data storage unit, reading out, in the case that the number of times that the lens shape data have been used is lower than the number of times that the lens shape data can be used, the lens shape data from the lens data storage unit, then increasing by the number of times that the lens shape data have been used the usage number stored in the usage number storage unit, a lens shape data memory in which the lens shape data read out by the access control unit are stored, and a lens manufacturing unit adapted for manufacturing lens based on lens shape data stored in the lens shape data memory, then erasing the lens shape data therefrom after manufacture.

In the aforementioned lens manufacturing equipment, the lens data can be otherwise arranged so as to contain an availability time limit for the lens shape data and the access control unit in such a way to read out from the lens data storage unit the lens shape data availability time limit, and if such availability time limit has not expired and the lens shape data usage number is lower than the available usage number thereof, to read out the lens shape data from the lens data storage unit.

In another embodiment, the lens design data utilization management system is equipped with a lens processing management device which manages lens processing using lens design data and a lens design data utilization management device capable of communicating with the lens processing management device. In such a system, the lens processing management device comprises an acknowledgement request for processing availability transmitting unit adapted for tranmitting to the lens design data utilization management device a request to acknowledge lens processing availability before performing such lens processing using lens design data, and a lens processing control unit adapted for controlling lens processing performance upon reception of a processing permission response permitting lens processing as the response to the availability acknowledgement resquest for processing availability transmitted by the acknowledgement request for processing availability transmitting unit. The aforementioned lens design data utilization management device comprises a processing availability decision unit which decides whether to permit or not lens processing based on information relating to lens design data usage status toward an acknowledgement request for processing availability transmitted by the acknowledgement request for processing availability transmitting unit, and a processing availability response unit which transmits to the lens processing management device a processing permission response in the case that the processing availability decision unit has permitted lens processing.

In such an arrangement, the lens design data utilization management system decides, before the lens processing management device performs any lens processing using lens design data, whether or not to permit lens processing based on information relating to lens design data usage status. Since the lens processing management device controls the lens processing performance if the lens design data utilization management device has decided to permit lens processing, the lens design data usage status could be appropriately managed while preventing any lens processing using illicitly said lens design data.

In the aforementioned lens design data utilization management system, the information relating to the lens design data usage status refers to the cumulative number of processings performed using the lens design data under the control of the lens processing management device and the processing availability decision unit can permit lens processing using said lens design data in the case that the cumulative processing number does not exceed a preliminarily stored maximum processing number.

According to such arrangement, the lens design data utilization management system whereby the lens design data utilization management device permits lens processing using lens design data if the cumulative processing number does not exceed the aforementioned maximum processing number, therefore allows to prevent lens processing from being performed illicitly using lens design data when a maximum processing number as set forth by contract or the like is exceeded.

In the aforementioned lens design data utilization management system, the lens design data utilization management device comprises a cumulative processing number calculating unit which calculates the cumulative processing number of each lens design data for the processing number as permitted by the processing permission response; thus, the processing availability decision unit can permit lens processing using said lens design data if the cumulative processing number as calculated by the cumulative processing number calculating unit does not exceed a prememorized maximum processing number.

According to such arrangement, the lens design data utilization management system whereby the lens design data utilization management device calculates the cumulative processing number, therefore allows to appropriately manage said cumulative processing number.

The maximum processing number in the aforementioned lens design data utilization management system can be set less than or equal to 20.

In the aforementioned lens design data utilization management system, the information relating to the lens design data usage status refers to the initial response date of the processing permission response. The processing availability response unit stores in a first-time permission response date storage unit the initial response date of the processing permission response and the processing availability decision unit, in the case that the reception date of acknowledgement request for processing availability is within the prememorized period of time from the initial response date of the processing permission response as stored in the first-time permission response date storage unit, can permit lens processing using said lens design data.

According to such arrangement, the lens design data utilization management system in which the lens design data utilization management device permits lens processing using lens design data if the reception date of the request to acknowledge processing availability falls within a preliminarily stored period of time from the initial response date of the processing availability response, allows for preventing lens processing from being performed illicitly using lens design data having exceeded the period of time set forth by contract or the like.

The prememorized period of time in the aforementioned lens design data utilization management system can be set within 20 days.

Several embodiments of the invention make it possible to deter companies having received lens design data from illicitly manufacture lens at the expense of the company involved in optical design. More specifically, the present invention allows for impeding to manufacture lens using lens design data having exceeded the available usage number.

In several embodiments of the invention, the lens design data utilization management system whereby the lens design data utilization management device decides whether or not to permit lens processing based on information relating to the lens design data usage status before the lens processing management device performs lens processing using lens design data, and the lens processing management device controls lens processing performance in the case that the lens design data utilization management device has decided to permit lens processing, therefore allows for preventing from illicitly processing lens using said lens design data.

Description of the Numerals

1 . . . Lens manufacturing system, 10 . . . design device, 20 . . . lens manufacturing equipment, 21 . . . data inputting unit, 22 . . . lens data storage unit, 23 . . . usage number storage unit, 24 . . . access control unit, 25 . . . operation unit, 26 . . . lens manufacturing unit, 27 . . . plane shape data memory, 28 . . . transceiver unit, 30 . . . management server, 31 . . . transceiver unit, 32 . . . conditions storage unit, 33 . . . usage number storage unit, 34 . . . accessibility determination unit, a2, b2, c2 . . . servers, a1 . . . prescription data transmitting device, b1 . . . lens processing device, c1 . . . lens design unit, E1 . . . lens processing management device, E2 . . . lens design data utilization management device, b10 . . . communication unit, b11 . . . prescription data transceiver unit, b13 . . . lens design data storage unit, b14 . . . processing start instruction inputting unit, b15 . . . acknowledgment request for processing availability transmitting unit, b16 . . . lens processing control unit, b17 . . . lens processing unit, c10 . . . communication unit, c11 . . . prescription data receiving unit, c12 . . . prescription data outputting unit, c13 . . . lens design data inputting unit, c14 . . . lens design data transmitting unit, c15 . . . acknowledgement request for processing availability receiving unit, c16 . . . processing availability decision unit, c17 . . . lens design data utilization information storage unit (first-time permission response date storage unit), c18 . . . processing availability response unit, c19 . . . cumulative processing number calculating unit.

What is claimed is:

1. A lens processing management system comprising:
a processing device adapted for processing lenses;
a data supply device capable of supplying lens shape design data to the processing device adapted for storing lens data containing lens shape design data which represent lens shape and an available usage number corresponding to a number of times that the lens shape design data can be used;
a usage number storage device adapted for storing a usage number corresponding to a number of times that the lens shape design data have been used; and
an access control device adapted for reading out the number of times that the lens shape design data have been used from the usage number storage device, and, only if the number of times that the lens shape design data have been used is less than the available usage number of the lens shape design data, reading out the lens shape design data from the data supply device to the processing device, then increasing by the number of times that the lens shape design data have been used the usage number stored in the usage number storage device.

2. The lens processing management system according to claim 1, wherein the access control device restricts lens processing over a network or virtually without involving a network.

3. The lens processing management system according to claim 1,
wherein the data supply device is further adapted for storing an availability time limit for the lens shape design data; and
wherein the access control device is further adapted for reading out an availability time limit for the lens shape design data from the data supply device, and, only if an availability time limit has not expired, and only if the number of times that the lens shape design data have been used is less than an available usage number of the lens shape design data, reading out the lens shape data from the lens data supply device to the processing device.

4. The lens processing management system according to claim 3, further comprising a management means adapted for managing at least one among the usage number of lens shape design data and the availability time limit in the processing device.

5. The lens processing management system according to claim 4, wherein the management means comprises a portable first media on which prescribed data relating to at least one among the usage number and the availability time limit have been stored.

6. The lens processing management system according to claim 1, wherein the access control device comprises a duplication restricting means by which duplication of lens shape design data is restricted.

7. The lens processing management system according to claim 6, wherein the duplication restricting means restricts lens shape design data saving onto media other than a prescribed media.

8. The lens processing management system according to claim 6, wherein the duplication restricting means controls flow of lens shape design data supplied from the data supply device to the processing device.

9. The lens processing management system according to claim 1, wherein the access control device comprises a switching means adapted for switching the processing device at least between a restricted state and a non-restricted state, such that in the restricted state the lens shape design data cannot be used by the processing device for processing lenses, and such that in the non-restricted state the lens shape design data can be used by the processing device for processing lenses.

10. The lens processing management system according to claim 1, wherein the access control device comprises a record holding means virtually located into the processing device and adapted for holding records of operation thereof, and a billing means adapted for carrying out accounting treatment on the basis of such records held by the record holding means.

11. The lens processing management system according to claim 1, wherein the data supply device comprises a design unit virtually located in the processing device and adapted for designing at least one part of a lens; and wherein the access control device comprises a server adapted for requesting design permission from the design unit.

12. The lens processing management system according to claim 1, wherein the data supply device comprises a transportable second media adapted for storing the lens shape design data.

13. The lens processing management system according to claim 12, wherein the number of times that the lens shape design data are stored in the second media is restricted.

14. The lens processing management system according to claim 12, wherein the second media is supplied to the processing device along with a half-finished lens or is embedded therein.

15. The lens processing management system according to claim 1, wherein the access control device comprises a selecting means adapted for selecting the processing device.

16. The lens processing management system according to claim 1, wherein the lens shape design data are supplied to the processing device in an encrypted state.

17. A lens manufacturing equipment comprising:
a lens data storage unit adapted for storing lens data containing lens shape design data which represent lens shape and an available usage number corresponding to a number of times that lens shape design data can be used;
a usage number storage unit adapted for storing a number of times that the lens shape design data have been used;
an access control unit adapted for reading out the number of times that the lens shape design data have been used from the usage number storage unit, and only if the number of times that the lens shape design data have been used is less than the available usage number of the lens shape design data, reading out the lens shape design data from the lens data storage unit, then increasing by the number of times that the lens shape design data have been used the usage number stored in the usage number storage unit;
a lens shape data memory adapted for storing the lens shape design data read out by the access control unit; and
a lens manufacturing unit adapted for manufacturing a lens based on the lens shape design data stored in the lens shape data memory, then erasing the lens shape design data therefrom after manufacture.

18. The lens processing device according to claim 17,
wherein the lens data further contain an availability time limit for the lens shape design data, and
wherein the access control unit reads out the availability time limit for the lens shape design data from the lens data storage unit and, only if the availability time limit has not expired and only if the number of times that the lens shape design data have been used is less than the available usage number thereof, reads out the lens shape design data from the lens data storage unit.

19. A lens manufacturing system comprising a lens manufacturing equipment and a management server capable of transmitting or receiving data to or from each other over a network,
wherein the lens manufacturing equipment comprises:
a lens data storage unit adapted for storing lens shape design data representing the shape of a lens in association with identification information thereof;
a transceiver unit adapted for transmitting or receiving data to or from the management server over a network;
an access control unit adapted for transmitting requests to use the lens shape design data containing identification information to the management server through the transceiver unit and, only if a lens shape design data usage permission information indicating that lens shape design data usage is permitted is received from the management server through the transceiver unit, for reading out from the lens data storage unit the lens shape design data corresponding to the identification information;
a lens shape data memory adapted for storing lens shape design data read out by the access control unit; and
a lens manufacturing unit adapted for manufacturing a lens based on the lens shape design data stored into the lens shape data memory, then erasing the lens shape design data therefrom after manufacture; and
wherein the management server comprises:
a transceiver unit adapted for transmitting or receiving data to or from the lens manufacturing equipment over a network;
an usage number storage unit adapted for storing in association with an identification information a number of times that the lens shape design data have been used;
an available usage number storage unit adapted for storing in association with identification information thereof an available usage number corresponding to a number of times that the lens shape design data can be used; and
an accessibility determination unit adapted for reading out from the usage number storage unit the number of times that the lens shape design data corresponding to the identification information contained in the request to use lens shape design data received from the lens manufacturing equipment through the transceiver unit have been used, reading out from the available usage number storage unit the available usage number corresponding to the identification information and, only if the number of times that the lens shape data have been used is less than the available usage number thereof, for transmitting to the lens manufacturing equipment through the transceiver unit an information to permit usage of the lens shape design data, then increasing by the number of times that the lens shape design data have been used the usage number stored in the usage number storage unit.

20. A lens manufacturing equipment comprising:
a lens data storage unit adapted for storing in association with an identification information lens shape design data representing the shape of a lens;
a transceiver unit adapted for transmitting or receiving data to or from a management server over a network;
an access control unit adapted for transmitting requests to use lens shape design data containing identification information to the management server through the transceiver unit and only if, after availability usage of lens shape design data has been determined based on an available usage number corresponding to a number of times that the lens shape design data can be used and the usage number stored in the management server in association with identification information, an information to permit usage of lens shape design data indicating the permission to use lens shape design data is received from the management server through the transceiver unit, reading out the lens shape design data corresponding to the identification information from the lens data storage unit;
a lens shape data memory adapted for storing the lens shape design data read out by the access control unit; and
a lens manufacturing unit adapted for manufacturing the lens based on the lens shape design data stored in the lens shape data memory, then for erasing the lens shape design data therefrom after manufacture.

21. A lens manufacturing system comprising a lens manufacturing equipment and a management server capable of transmitting or receiving data to or from each other over a network, wherein the lens manufacturing equipment comprises:
a lens data storage unit adapted for storing in association with an identification information lens shape design data representing the shape of a lens;
a transceiver unit adapted for transmitting or receiving data to or from the management server over a network;
an access control unit adapted for transmitting requests to use the lens shape design data containing the identification information to the management server through the transceiver unit and reading out from the lens data storage unit the lens shape design data corresponding to the identification information;
a lens shape data memory adapted for storing the lens shape design data read out by the access control unit; and
a lens manufacturing unit adapted for manufacturing lenses based on the lens shape design data stored in the lens shape data memory, then erasing the lens shape design data therefrom after manufacture; and
wherein the management server comprises:
a transceiver unit adapted for transmitting or receiving data to or from the lens manufacturing equipment over a network;
a usage number storage unit adapted for storing in association with identification information thereof a number of times that the lens shape data have been used and an available usage number; and
a usage number counting unit adapted for, upon receiving of a request to use lens shape design data from the lens manufacturing equipment through the transceiver unit, increasing by the number of times that the lens shape data have been used the usage number stored in the usage number storage unit in association with the identification information contained in the received request to use lens shape data,
wherein the transceiver unit transmits to the lens manufacturing equipment the lens shape design data only if the number of times that the lens shape data have been used is less than the available usage number.

22. A lens manufacturing method performed by a lens manufacturing equipment comprising a lens data storage unit which contains lens shape design data representing the shape of a lens and an available usage number corresponding to a number of times that these data can be used, an usage number storage unit adapted for storing the number of times that the lens shape design data have been used, a lens shape data memory which stores lens shape design data and a lens manufacturing unit which manufactures the lens based on the lens shape design data stored into the lens shape data memory, comprising:
a step of reading out from the usage number storing unit the number of times that the lens shape design data have been used;
a step of reading out from the lens data storage unit the available usage number of the lens shape design data;
only if the number of times that the lens shape design data have been used is less than the available usage number thereof, a step of reading out the lens shape design data from the lens data storage unit, then increasing by the number of times that the lens shape design data have been used the usage number stored in the usage number storage unit;
a step of writing in the lens shape design data the read-out lens shape design data;
a step of manufacturing the lens based on the lens shape design data stored into the lens shape data memory by the lens manufacturing unit; and
a step of erasing the lens shape design data from the lens shape data memory upon completion of lens manufacture.

23. A non-statutory computer readable medium for causing a computer comprising a lens data storage unit which stores lens data containing lens shape design data representing the shape of a lens and a number of times that these data have been used, a usage number storage unit adapted for storing the number of times that the lens shape design data have been used, a lens shape data memory which stores the lens shape design data and a lens manufacturing unit which manufactures the lens based on the lens shape design data stored into the lens shape data memory, to execute:
a step of reading out from the usage number storage unit the number of times that the lens shape data have been used;
a step of reading out from the lens data storage unit an available usage number corresponding to a number of times that lens shape design data can be used;
only if the number of times that the lens shape design data have been used is less than the available usage number of lens shape design data, a step of reading out the lens shape design data from the lens data storage unit, then increasing by the number of times that the lens shape design data have been used the usage number stored in the usage number storage unit;
a step of writing in the lens shape design data the read-out lens shape design data;
a step of manufacturing the lens based on the lens shape design data stored into the lens shape data memory by the lens manufacturing unit; and
a step of erasing the lens shape design data from the lens shape data memory upon completion of lens manufacture.

24. A lens design data utilization management system comprising a lens processing management device adapted for managing lens processing using lens shape design data and a lens design data utilization management device adapted for communicating with the lens processing management device,
wherein the lens processing managing device comprises:
an acknowledgement request for processing availability transmitting unit adapted for transmitting an acknowledgement request for lens processing availability in order to acknowledge the availability of lens processing to the lens design data utilization management device; and
a lens processing control unit which controls performance of lens processing only if a processing permission indicating to permit lens processing is received in response to the acknowledgement request for processing availability transmitted by the acknowledgement request for processing availability transmitting unit; and
wherein the lens design data utilization management device comprises:
a processing availability decision unit which decides, in response to an acknowledgement request for processing availability transmitted by the acknowledgement request for processing availability transmitting unit, whether or not to permit lens processing based on information relating to a lens shape data usage status; and
a processing availability response unit which transmits to the lens processing management device a processing permission response only if the processing availability decision unit has permitted lens processing,
wherein the information relating to the lens shape data usage status relates to a cumulative processing number of times that processing has been performed using lens shape design data under the control of the lens processing management device for each of the lens shape design data; and wherein the processing availability decision unit permits lens processing using the lens shape design data only if the cumulative processing number does not exceed a predetermined maximum processing number.

25. The lens design data utilization management system according to claim 24, wherein the lens design data utilization management device comprises a cumulative processing number calculating unit adapted for calculating for each lens shape design data the cumulative processing number for the number of processings having been permitted by the processing permission response; and wherein the processing availability decision unit permits lens processing using lens shape design data only if the cumulative processing number calculated by the cumulative processing number calculating unit does not exceed a predetermined maximum processing number.

26. The lens design data utilization management system according to claim 25, wherein the maximum processing number is equal to or less than 20.

27. The lens design data utilization management system according to claim 24, wherein the information relating to the lens shape data usage status relates to an initial response date of the processing permission response; wherein the processing availability response unit causes the initial response date of the processing permission response to be stored into a first-time permission response date storage unit; and wherein the processing availability decision unit permits lens processing using lens shape design data only if the receiving date of the acknowledgement request for processing availability falls within a predetermined period of time from the initial response date of the processing permission response stored by the first-time permission response date storage unit.

28. The lens design data utilization management system according to claim 27, wherein the predetermined period of time is equal to or less than 20 days.

29. A lens processing management device adapted for communicating with a lens design data utilization management device and managing lens processing using lens shape design data, comprising:
an acknowledgement request for processing availability transmitting unit adapted for transmitting to the lens design data utilization management device, before performing lens processing using the lens shape design data, an acknowledgement request for processing availability to acknowledge the availability of lens processing; and
a lens processing control unit which controls performance of lens processing only if a processing permission response indicating that lens processing is permitted is received in response to the acknowledgement request for processing availability transmitted by the acknowledgement request for processing availability transmitting unit, wherein lens processing is permitted only if a number of times that the lens shape design data have been used is less than an available usage number of the lens shape design data.

30. A lens design data utilization management device capable of communicating with a lens processing management device, comprising:
a processing availability decision unit adapted for deciding, in response to an acknowledgement request for processing availability to acknowledge lens processing availability transmitted from the lens processing management device, whether or not to permit lens processing based on information relating to a lens design data usage status, wherein lens processing is permitted only if a number of times that lens shape design data have been used is less than an available usage number of the lens shape design data; and
a processing permission response unit adapted for transmitting to the lens processing management device a processing permission response indicating that processing of lens is permitted only if the processing availability decision unit has made a decision to permit lens processing.

31. A lens processing non-statutory computer readable medium which causes a computer in a lens processing management device capable to communicate with a lens design data utilization management device and to manage processing of a lens using lens shape design data to function as:
an acknowledgement request for processing availability transmitting means adapted for transmitting to the lens design data utilization management device an acknowledgement request for processing availability to acknowledge lens processing availability before performing lens processing using the lens shape design data; and
a lens processing control means adapted for controlling performance of lens processing only if a processing permission response indicating that lens processing is permitted has been received in response to an acknowledgement request for processing availability transmitted by the acknowledgement request for processing availability transmitting means, wherein lens processing is permitted only if a number of times that the lens shape design data have been used is less than an available usage number of the lens shape design data.

32. A lens design data utilization non-statutory computer readable medium which causes a computer in a lens design data utilization management device capable of communicating with a lens processing management device to function as:
a processing availability decision means adapted for deciding, in response to an acknowledgement request for processing availability to acknowledge lens processing availability transmitted from the lens processing management device, whether or not to permit lens processing based on information relating to a lens design data usage status, wherein lens processing is permitted only if a number of times that lens shape design data have been used is less than an available usage number of the lens shape design data; and
a processing availability acknowledgement response means adapted for transmitting to the lens processing management device a processing permission response indicating that processing of a lens is permitted, only if the processing availability decision means has decided to permit lens processing.

* * * * *